United States Patent
Wilson et al.

(10) Patent No.: US 12,365,620 B2
(45) Date of Patent: *Jul. 22, 2025

(54) PATTERNED ASYMMETRIC CHEMICAL STRENGTHENING

(71) Applicant: Apple Inc., Cupertino, CA (US)

(72) Inventors: James R. Wilson, Cupertino, CA (US); Christopher D. Jones, Los Altos, CA (US); Christopher C. Bartlow, Menlo Park, CA (US); Aidan R. Doan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/140,775

(22) Filed: Apr. 28, 2023

(65) Prior Publication Data
US 2023/0303434 A1    Sep. 28, 2023

Related U.S. Application Data

(63) Continuation of application No. 16/262,813, filed on Jan. 30, 2019, now Pat. No. 11,639,307.

(60) Provisional application No. 62/697,933, filed on Jul. 13, 2018.

(51) Int. Cl.
*C03C 21/00* (2006.01)
*G06F 1/16* (2006.01)

(52) U.S. Cl.
CPC .......... *C03C 21/002* (2013.01); *G06F 1/1605* (2013.01); *G06F 1/1637* (2013.01); *G06F 1/1656* (2013.01)

(58) Field of Classification Search
None
See application file for complete search history.

(56) References Cited

U.S. PATENT DOCUMENTS

| | | |
|---|---|---|
| 3,287,200 A | 11/1966 | Hess et al. |
| 8,652,639 B2 | 2/2014 | Chu et al. |
| 9,187,358 B2 | 11/2015 | Luo et al. |
| 9,221,715 B2 | 12/2015 | Rogers et al. |
| 9,292,634 B2 | 3/2016 | Ahmed et al. |
| 9,725,359 B2 | 8/2017 | Weber |
| 9,790,128 B2 | 10/2017 | Garner et al. |
| 9,886,062 B2 | 2/2018 | Qian et al. |

(Continued)

FOREIGN PATENT DOCUMENTS

| | | |
|---|---|---|
| CN | 1491911 | 4/2004 |
| CN | 102131740 | 7/2011 |

(Continued)

*Primary Examiner* — David Sample
(74) *Attorney, Agent, or Firm* — Brownstein Hyatt Farber Schreck, LLP

(57) ABSTRACT

A glass sheet having asymmetric chemical strengthening is disclosed and described. The examples described herein are directed to a cover glass for an electronic device and other glass components that may be used as enclosure elements or may form an enclosure. Within the glass component, localized compressive stress regions may be formed on opposite sides of the glass component, which may help arrest or redirect propagating cracks or defects in the glass. The opposing compressive stress regions may also help maintain the overall flatness of the component while increasing strength and/or impact resistance of the component.

20 Claims, 25 Drawing Sheets

(56) References Cited

U.S. PATENT DOCUMENTS

| | | |
|---|---|---|
| 9,946,302 B2 | 4/2018 | Franklin et al. |
| 10,071,933 B2 | 9/2018 | Wang et al. |
| 10,206,298 B2 | 2/2019 | Memering et al. |
| 10,781,135 B2 | 9/2020 | Weber et al. |
| 10,899,660 B2 | 1/2021 | Luzzato et al. |
| 11,247,937 B2 | 2/2022 | Luzzato et al. |
| 11,447,416 B2 | 9/2022 | Davis et al. |
| 11,565,969 B2 | 1/2023 | Luzzato et al. |
| 11,639,307 B2 * | 5/2023 | Wilson .................. G06F 1/1656 428/410 |
| 2005/0184637 A1 | 8/2005 | Sugawara et al. |
| 2010/0285260 A1 | 11/2010 | Bookbinder et al. |
| 2011/0019123 A1 | 1/2011 | Prest et al. |
| 2011/0154861 A1 | 6/2011 | Kishimoto et al. |
| 2012/0194974 A1 | 8/2012 | Weber et al. |
| 2012/0236526 A1 | 9/2012 | Weber et al. |
| 2013/0122254 A1 | 3/2013 | Liang |
| 2013/0122260 A1 | 5/2013 | Liang |
| 2014/0034374 A1 | 2/2014 | Cornejo et al. |
| 2014/0078412 A1 | 3/2014 | Franklin et al. |
| 2014/0111954 A1 | 4/2014 | Lee et al. |
| 2014/0162029 A1 | 6/2014 | Takeuchi et al. |
| 2014/0370244 A1 | 12/2014 | Kinoshita et al. |
| 2015/0044445 A1 | 2/2015 | Garner et al. |
| 2015/0147538 A1 | 5/2015 | Ishimaru et al. |
| 2015/0248142 A1 | 9/2015 | Qian et al. |
| 2015/0274585 A1 | 10/2015 | Rogers et al. |
| 2016/0326050 A1 | 11/2016 | Lee et al. |
| 2017/0334770 A1 | 11/2017 | Luzzato et al. |
| 2018/0009706 A1 | 1/2018 | Luo et al. |
| 2018/0016188 A1 | 1/2018 | Garner et al. |
| 2019/0161401 A1 | 5/2019 | Kuang et al. |
| 2019/0330103 A1 | 10/2019 | Ozeki et al. |
| 2023/0002273 A1 | 1/2023 | Davis et al. |
| 2023/0167021 A1 | 6/2023 | Luzzato et al. |
| 2023/0232558 A1 | 7/2023 | Bartlow et al. |

FOREIGN PATENT DOCUMENTS

| | | |
|---|---|---|
| CN | 102388003 | 3/2012 |
| CN | 102421597 | 4/2012 |
| CN | 102557467 | 7/2012 |
| CN | 102612500 | 7/2012 |
| CN | 103261112 | 8/2013 |
| CN | 103391903 | 11/2013 |
| CN | 103476727 | 12/2013 |
| CN | 103748047 | 4/2014 |
| CN | 104144877 | 11/2014 |
| CN | 105683118 | 6/2016 |
| CN | 105705467 | 6/2016 |
| CN | 105873871 | 8/2016 |
| CN | 106061913 | 10/2016 |
| CN | 106164004 | 11/2016 |
| CN | 106380087 | 2/2017 |
| CN | 106673458 | 5/2017 |
| CN | 107117810 | 9/2017 |
| DE | 102012213071 | 7/2013 |
| JP | 2000233949 | 8/2000 |
| JP | 2004510012 | 4/2004 |
| JP | 2005298312 | 10/2005 |
| JP | 2009234856 | 10/2009 |
| JP | 2014510012 | 4/2014 |
| JP | 2015006959 | 1/2015 |
| JP | 2017030997 | 2/2017 |
| JP | 2018168030 | 11/2018 |
| KR | 20170033209 | 3/2017 |
| TW | 201819327 | 6/2018 |
| WO | WO2013/088910 | 6/2013 |
| WO | WO2015/031151 | 3/2015 |
| WO | WO2015/057552 | 4/2015 |
| WO | WO2015130494 | 9/2015 |
| WO | WO2015/146169 | 10/2015 |
| WO | WO2016/149860 | 9/2016 |
| WO | WO2016/172292 | 10/2016 |
| WO | WO2017/026190 | 2/2017 |
| WO | WO2018/066314 | 4/2018 |
| WO | WO2018/116981 | 6/2018 |

* cited by examiner

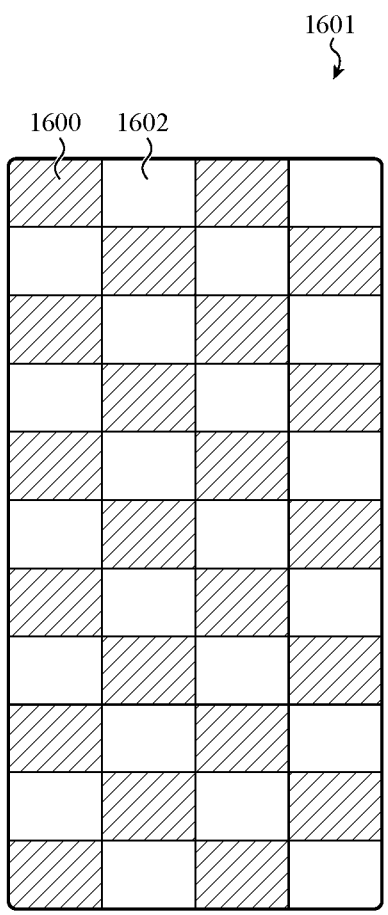
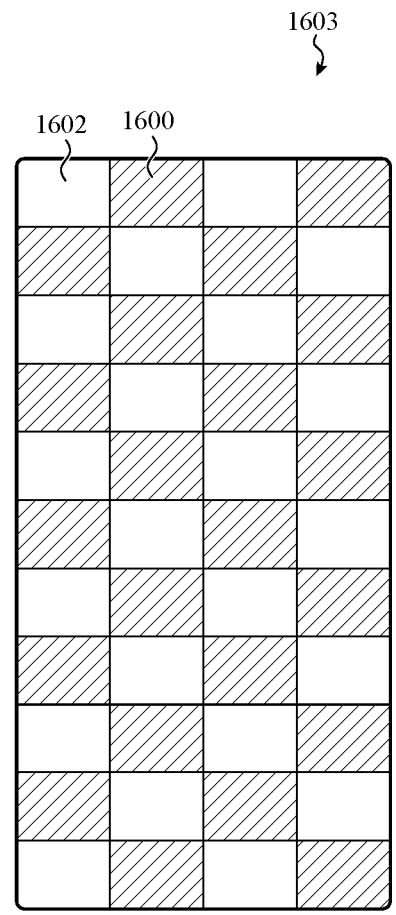
*FIG. 16A*          *FIG. 16B*

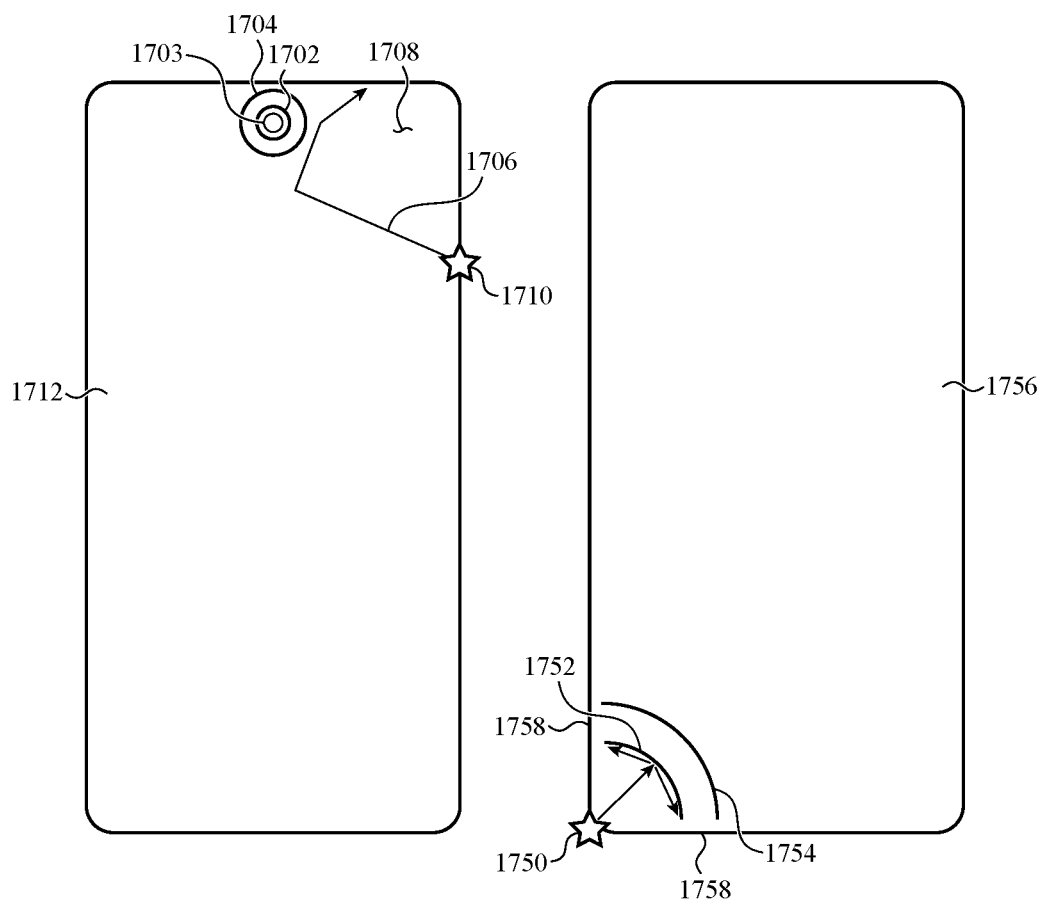
*FIG. 17A*  *FIG. 17B*

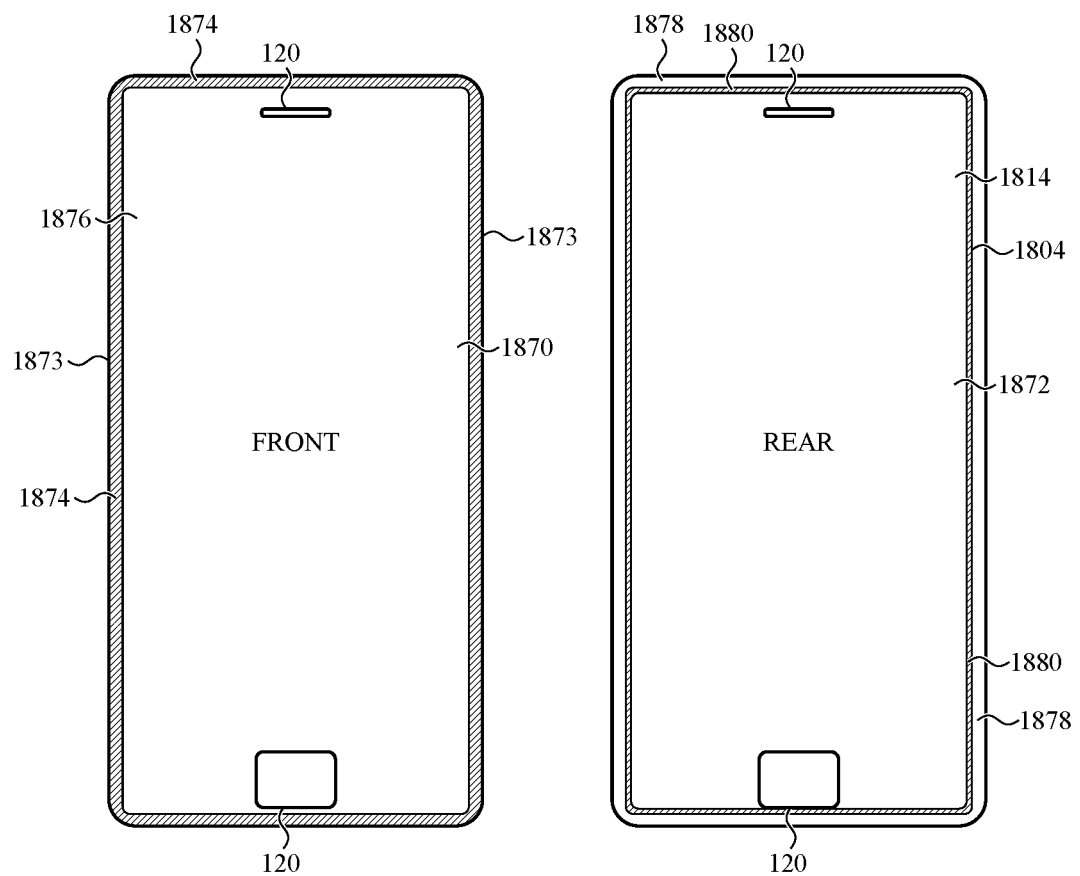
*FIG. 18E*  *FIG. 18F*

PATTERNED ASYMMETRIC CHEMICAL STRENGTHENING

CROSS-REFERENCE TO RELATED APPLICATIONS

This application is a continuation patent application of U.S. patent application Ser. No. 16/262,813, filed Jan. 30, 2019 and titled "Patterned Asymmetric Chemical Strengthening," which is a nonprovisional patent application of and claims the benefit of U.S. Provisional Patent Application No. 62/697,933, filed Jul. 13, 2018 and titled "Patterned Asymmetric Chemical Strengthening," the disclosures of which are hereby incorporated herein by reference in their entireties.

FIELD

The described embodiments relate generally to asymmetric chemical strengthening of a glass article. More particularly, the present embodiments relate to patterned asymmetric chemical strengthening having an increased depth of compression over at least one localized region.

BACKGROUND

The cover window and display for small form factor devices are typically made of glass. Glass, although transparent and scratch resistant, is brittle and prone to impact failure. Providing a reasonable level of strength in these glass parts is crucial to reducing the likelihood of glass part failure, and hence device failure.

Chemical strengthening has been used to increase the strength of glass parts. Typical chemical strengthening relies on a uniform and symmetric increase of the compression stress over the entire surface of the glass part. Such strengthening processes have proven effective at reducing some level of failure in glass parts. More recently, asymmetric chemical strengthening has been established as a method for increasing the depth of compressive stress at local problematic areas of a glass part. The increased depth of compressive stress in a glass part affords that area better protection against impact related failure. However, asymmetric chemical strengthening, among other things, may lead to warpage in the glass part due to the localized higher compression, which can be exacerbated when the glass part is of a thickness and composition for use in small form factor devices.

As such, while conventional symmetric and asymmetric chemical strengthening are effective, there is a continuing need to provide improved and alternative ways to strengthen glass, particularly thin glass.

SUMMARY

Various embodiments described herein encompass asymmetrically strengthened glass articles. Asymmetrically strengthened glass articles can have enhanced reliability and safety as compared to symmetrically strengthened glass articles. In embodiments, an asymmetrically strengthened glass article has a first region with a first stress distribution, and a second region with a second stress distribution. The first stress distribution and the second stress distribution differ from one another. For example, the first region may be a first compressive stress region and the second region may be a second compressive stress region. The differences in the first stress distribution and the second stress distribution can result in an overall stress imbalance in the asymmetrically strengthened glass article. The overall stress imbalance may cause the glass article to exhibit warpage. Embodiments herein relate to glass articles like cover glass, electronic devices, and methods that are useful in limiting warpage.

In aspects, a cover glass for an electronic device is described. The cover glass has a front surface. A first compressive stress region extends from the front surface to a first depth into the cover glass. A second compressive stress region extends from the front surface to a second depth, less than the first depth, into the cover glass. The cover glass also has a rear surface, which may be opposite to the front surface. A third compressive stress region extends from the rear surface toward the first compressive stress region and to a third depth into the cover glass. A fourth compressive stress region extends from the rear surface toward the second compressive stress region and to a fourth depth, greater than the third depth, into the cover glass.

In embodiments, the cover glass further includes a first tensile stress region positioned between the first compressive stress region and the third compressive stress region, and a second tensile stress region positioned between the second compressive stress region and the fourth compressive stress region. In addition, the cover glass can also include a first centerline of the first tensile stress region that is offset with respect to a second centerline of the second tensile stress region.

In additional embodiments, the second compressive stress region at least partially surrounds the first compressive stress region. The fourth compressive stress region can at least partially surround the third compressive stress region as well.

In further embodiments, the first depth is approximately equal to the fourth depth and the second depth is approximately equal to the third depth. The cover glass can define four corner regions, such that the first compressive stress region and the third compressive stress region are located at least partially within one of the four corner regions. In addition, the cover glass can define a rectangular outer perimeter region, where the first compressive stress region and the third compressive stress region are located at least partially within the outer perimeter region, and the first compressive stress region at least partially surrounds the second compressive stress region.

Additional aspects described herein include an electronic device comprising a display and an enclosure at least partially surrounding the display. The enclosure may comprise a first localized compressive stress region extending into the enclosure from a front surface of the enclosure to a first depth, a second localized compressive stress region adjacent to the first localized compressive stress region and extending into the enclosure from the front surface to a second depth, less than the first depth, and a rear localized compressive stress region extending into the enclosure from a rear surface of the enclosure towards the second localized compressive stress region. The rear localized compressive stress region may extend a third depth into the cover sheet that is greater than the second depth. Further, the rear localized compressive stress region may be offset with respect to the first localized compressive stress region.

In additional aspects of the electronic device, the first localized compressive stress region is at least partially surrounded by the second compressive stress region. In embodiments, the first localized compressive stress region includes potassium ions that extend into the cover sheet a first depth and the second localized compressive stress region includes potassium ions that extend into the cover sheet at a second depth that is less than the first depth. Further, the first depth can be at least twice the second depth.

In embodiments, the enclosure comprises a glass material. The enclosure may comprise a cover sheet positioned over the display; such as a glass cover sheet. The first and the second localized compressive stress regions may extend from a front surface of the cover sheet and the rear localized compressive stress region may extend from a rear surface of the cover sheet.

In still other aspects of the electronic device, the cover sheet defines a camera window, and the electronic device has a camera positioned below the camera window. The first localized compressive stress region is positioned at least partially within the camera window and extends into the cover sheet a first depth, and a second localized compressive stress region surrounds the first localized compressive stress region and extends into the cover sheet a second depth that is less than the first depth.

In some aspects of the electronic device, the cover sheet has a length of at least 100 mm and a width of at least 40 mm. The front surface of the cover sheet has a flatness that is no more than 120 µm out of plane.

Embodiments herein also include methods of forming a cover sheet for an electronic device. The method includes positioning a first mask along a first surface that defines at least a portion of an external surface of the electronic device and forming a first compressive stress region having a first thickness along the first surface by exchanging ions into the cover sheet. The method further includes removing the first mask and forming a second compressive stress region having a second thickness, less than the first thickness, adjacent to the first compressive stress region by exchanging ions into the cover sheet. The method further includes positioning a second mask along a second surface that is opposite the first surface and forming a third compressive stress region having a third thickness by exchanging ions into the cover sheet. The third compressive stress region extends from the second surface toward the second compressive stress region. The method further comprises removing the second mask and forming a fourth compressive stress region having a fourth thickness, less than the third thickness, by exchanging ions into the cover sheet. The fourth compressive stress region extends from the second surface toward the first compressive stress region.

In embodiments, an operation of forming a compressive stress region comprises immersing the cover sheet in a bath comprising the ions. The first compressive stress region may be formed using a first bath, the second compressive stress region may be formed using a second bath, the third compressive stress region may be formed using a third bath, and the fourth compressive stress region may be formed using a fourth bath. In some embodiments, the baths all comprise the same type of ions. In additional embodiments, the ion composition is substantially the same for some of the baths, such as first and the third baths and/or the second and the fourth baths.

In additional aspects of the method, the operation of forming a compressive stress region comprises immersing the cover sheet in a sequence of baths comprising the ions. The baths in the sequence may differ in composition. As an example, the cover sheet can comprise alumina silicate glass, and the operation of forming the first compressive stress region can comprise immersing the cover sheet into a first bath comprising sodium ions and subsequently immersing the cover sheet in a second bath comprising potassium ions. The first bath can include a sodium concentration of greater than 30% mol and the second bath can include a potassium concentration of greater than 30% mol.

In other aspects of the method, the cover sheet defines four corners, and the first mask leaves each of the four corners exposed along the first surface, and the second mask covers each of the four corners along the second surface.

Finally, the method may further comprise forming a first tensile stress region between the first compressive stress region and the fourth compressive stress region, and forming a second tensile stress region between the second compressive stress region and the third compressive stress region. The first tensile stress region may be offset with respect to a centerline of the glass sheet in a first direction and the second tensile stress region may be offset with respect to the centerline in a second direction that is opposite to the first direction.

BRIEF DESCRIPTION OF THE DRAWINGS

The disclosure will be readily understood by the following detailed description in conjunction with the accompanying drawings, wherein like reference numerals designate like structural elements, and in which:

FIG. 16A is a top surface of a cover glass showing an illustrative pattern for asymmetrically strengthening to avoid cover glass warpage.

FIG. 16B is a bottom surface of the cover glass in FIG. 16A showing patterned asymmetric strengthening to avoid cover glass warpage.

FIG. 17A is a top surface of a cover glass showing crack propagation to avoid a camera window in accordance with embodiments herein.

FIG. 17B is another illustrative view of a cover glass surface asymmetrically strengthened with a pattern to limit crack propagation into the center of the cover glass.

FIG. 18E is a user or top surface view of yet another cover glass having a pattern to provide chemical strengthening to the corners of the cover glass.

FIG. 18F is an internal or bottom surface view of a cover glass having an opposing strengthening pattern to FIG. 18E that limits cover glass warpage and limits crack propagation.

Figure 1A:
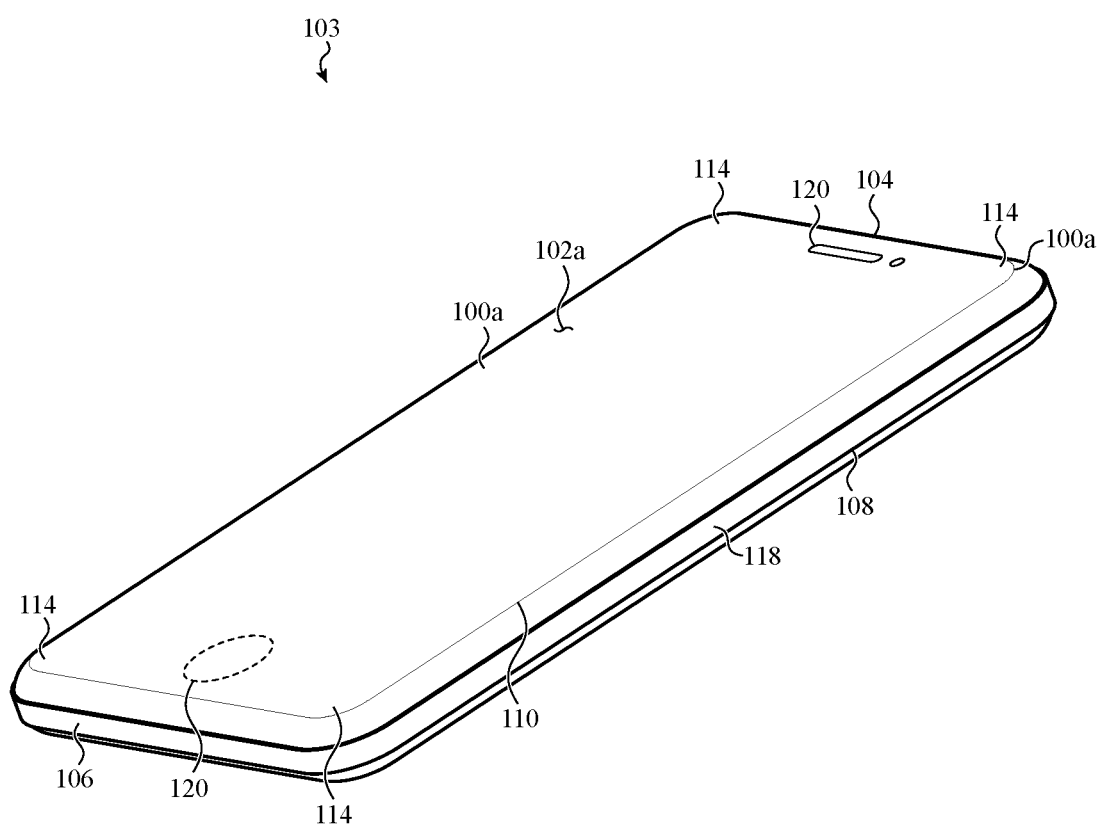
FIGS. 1A and 1B depict an example electronic device in accordance with embodiments herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

The following disclosure relates to glass articles or glass components (e.g., cover glass), methods of producing glass articles or glass components, and to the utility of such glass articles in an electronic device. Embodiments also relate to the inclusion of asymmetric compressive stress regions within a glass article in such a way as to maintain the glass article's flat surfaces while also providing the capability to direct cracks away from regions of interest or priority in an electronic device, e.g., sensors, cameras, center of the glass viewing zones, etc. In some cases, a front or external surface of the glass article is no more than 120 µm out of plane. In some embodiments, the electronic device can include an enclosure, a display positioned at least partially within the enclosure, and a glass article, for example a cover glass, in accordance with embodiments herein.

In some examples described herein, the glass component or glass article is a sheet of cover glass for an electronic device. The cover glass may define an external and/or internal surface of an electronic device. The glass article may correspond to a cover glass that helps form part of a display area and, in some instances, form part of the enclosure for the electronic device. In some instances, the glass article or multiple glass articles form the entire enclosure for the electronic device. The embodiments described herein are particularly relevant for use in portable electronic devices and small form factor electronic devices, e.g., laptops, mobile phones, media players, remote control units, and the like. Typical glass articles herein are thin, and typically less than 5 mm in thickness. In embodiments, the glass articles have a thickness from 0.3 to 3 mm, from 0.3 to 2.5 mm, or from 0.1 mm to less than 1 mm. However, the dimensions in any particular application may exceed these example ranges.

As used herein, "glass material" may generally refer broadly to a variety of transparent materials, including substantially non-crystalline amorphous solids and/or materials having at least some crystalline structures, such as glass ceramics of various compositions. Sample compositions of the glass material may include soda lime, aluminosilicate, boro-silicate (and variations thereof), high silica content (96% or greater), zinc titanium, or the like. The glass material may include other constituent components or may be formed from a composite material. Typically, the cover glass or other enclosure component includes an ion-exchangeable material, such as soda lime glass or an alkali aluminosilicate glass or glass ceramic.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1B:
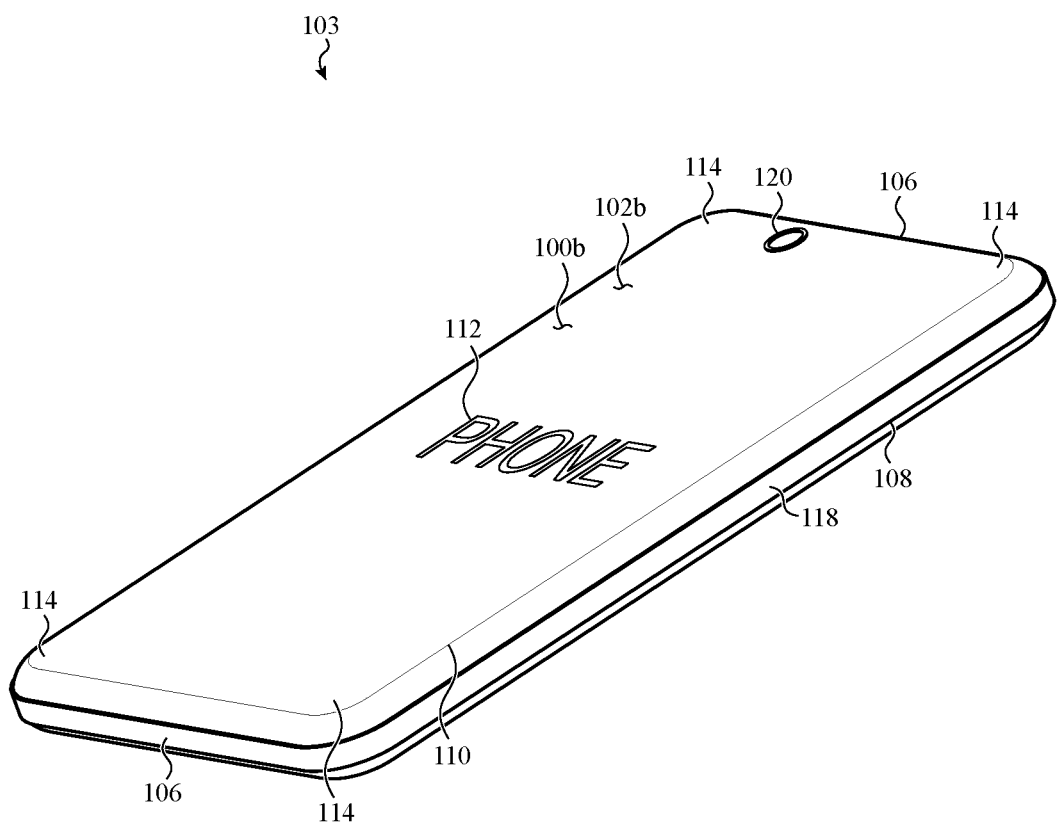

FIGS. 1A and 1B are perspective diagrams of an electronic device 103. The electronic device 103 may define a top surface 104, bottom surface 106, and side surfaces 108. In embodiments, the electronic device 103 has a cover, such as a cover glass including a thin sheet of glass with a length and width consistent with the application. As shown in FIG. 1A, the electronic device 103 can have a front cover glass 100a defining a front surface 102a. The electronic device may also include a rear cover glass 100b defining a rear surface 102b.

In embodiments, the cover comprises a single sheet of glass. In further embodiments, the cover may be formed from multiple layers that include glass sheets, polymer sheets, combinations of glass and polymer sheets, and/or various coatings and layers. In embodiments, the cover may be flexible or bendable.

For purposes of illustration, the electronic device 103 is depicted as having an enclosure component 118, a front cover glass 100a, and a rear cover glass 100b that together define the device enclosure or housing. In one example, the enclosure component 118 comprises a series of metal segments that are separated by polymer or dielectric segments that provide electrical isolation between adjacent metal segments. It should be noted that the electronic device 103 may also include various other components 120, including, without limitation, speakers, buttons, microphones, one or more ports (e.g., charging ports, data transfer ports, or the like), touch sensors, cameras, and so on as described in further detail with respect to FIG. 19.

In an embodiment, the enclosure component 118, the front cover glass 100a, the rear cover glass 100b, and/or other component of the electronic device 103 may be formed from, or include, a cover sheet or otherwise be transparent or have a transparent window region or portion. As shown in FIG. 1A, the front cover glass 100a defines the entire front face or surface of the electronic device 103.

As shown in FIGS. 1A and 1B, the enclosure component 118, the front cover glass 100a, and the rear cover glass 100b are three separate and distinct components that together define an enclosure of the electronic device 103. However, in some embodiments, the enclosure component 118, the front cover glass 100a, and the rear cover glass 100b are formed together as a single monolithic structure or component. For example, the single monolithic glass component may define a portion of a sidewall of the enclosure and optionally a front and/or rear surface of the enclosure. In addition, a single monolithic glass component may form the front, rear, top, bottom, and/or side surfaces of the enclosure of the electronic device 103. In another alternative embodiment, the enclosure component 118 defines the entire rear face or surface of the enclosure, as well as the top, bottom, and/or the sides of the enclosure.

One or both of the front and rear cover glass 100a, 100b may define a transparent window region. A transparent window region may extend over a display component, a camera, an optical sensor, or another optical or visual device 120. For example, a front cover glass 100a may be positioned over a display component that is configured to produce a graphical output that is viewable through a transparent window region of the cover member. In some instances, a touch-sensitive layer (e.g., a capacitive touch sensor) is attached to the cover glass and positioned between the cover glass and the display component. Further, one or both of the front and rear cover glass may include one or more openings for a camera, light source, or other optical component.

In general, a transparent window region may be a portion of the cover glass 100a, 100b that is free from markings, textures, inks, and so on. In some cases, the transparent window region may be a transparent portion of a cover glass that may have substantially opaque regions adjacent the transparent window region. It will be appreciated that other non-window portions, including substantially all of the cover glass 100a, 100b, may also be free from markings, textures, inks, and so on, as may be appropriate for a given application. In some cases, other portions 112 of the cover glass 100a, 100b may be partially covered by an ink or marking and, in some cases, may be translucent, opaque, or otherwise not perfectly transparent.

Each piece of cover glass 100a, 100b can have front and rear surfaces, respectively, and can be composed of regions, zones, and/or portions. For example, one region of a front cover glass 100a could correspond to the entire front surface 102a. Another region of the front cover glass 100a could be an area corresponding to one or more edges 110 of the glass. In some cases, this is referred to as a peripheral region or a rectangular peripheral region for a rectangular front cover glass 100a. A region or zone having the same glass attributes can be continuous; for example, all four edges of the cover glass may be representative of a single region or zone. A region or zone having the same glass attributes can also be discontinuous, for example, the four corners 114 of the front cover glass 100a. The strength requirements for the surfaces and regions may differ on the use; for example, a front surface 102a, exposed to the outside environment, may require a different strength than the rear surface, enclosed away from the environment.

The differential strength requirements of a cover glass can be addressed using patterned asymmetric chemical strengthening, as described in further detail below, which can also be used to maintain a certain level of glass article flatness. With respect to flatness, in embodiments, a glass surface is flat if the glass surface is no more than 120 μm out of plane. In additional embodiments, a portion or region of the glass surface is flat to within a specified extent. For example, when the cover glass includes a bend or curve (e.g., the cover glass of FIG. 13), a central region of the cover glass may be flat as specified. This specification may be applied to devices that have a cover glass with a width that is at least 40 mm and a length that is at least 100 mm. In some cases, patterned asymmetric chemical strengthening can also be used to direct impact produced crack propagation away from the impact site to other regions in the glass of lower glass article priority.

Embodiments herein are discussed below with reference to FIGS. 2-18F. However, those skilled in the art will readily appreciate that the detailed description given herein with respect to these Figures is for explanatory purposes only and should not be construed as limiting.

Chemical Strengthening

Embodiments herein may utilize a glass chemical strengthening process where a glass article is first enhanced by immersion in a first ion solution (sodium, for example) and then strengthened by immersion in a second ion solution (potassium, for example). These processes can both be used to strengthen a glass article, as well as to direct or control impact created crack propagation within the glass article, all while keeping the glass article surfaces flat (e.g., limiting surface warpage).

Figure 2:
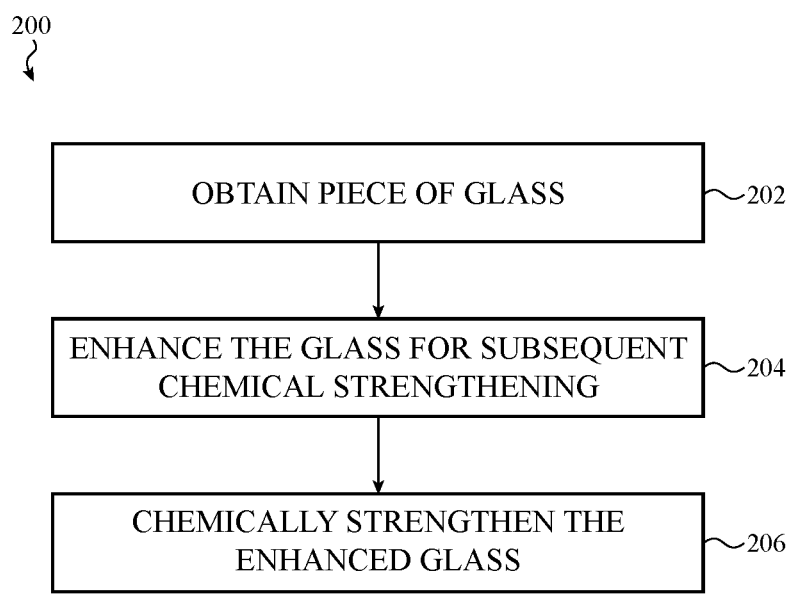
FIG. 2 is a flow diagram of a glass strengthening process in accordance with embodiments herein.

FIG. 2 is a flow diagram of a glass strengthening process 200 according to some embodiments. In embodiments, glass strengthening process 200 may use ion exchange to form a pattern of asymmetric compressive stress regions in a piece of glass. As shown in FIG. 2, glass strengthening process 200 begins with operation 202 of obtaining the piece of glass.

The glass strengthening process 200 further includes an operation 204 of enhancing the glass. The glass may be enhanced through chemical processing. For example, operation 204 may comprise a first ion-exchange operation. The first ion-exchange operation may use a first ion-exchange bath.

The glass strengthening process 200 further includes an operation 206 of chemically strengthening the glass through further chemical processing. For example, operation 206 may comprise a second ion-exchange operation. The second ion-exchange operation may use a second ion-exchange bath different from the first ion-exchange bath.

Figure 3:
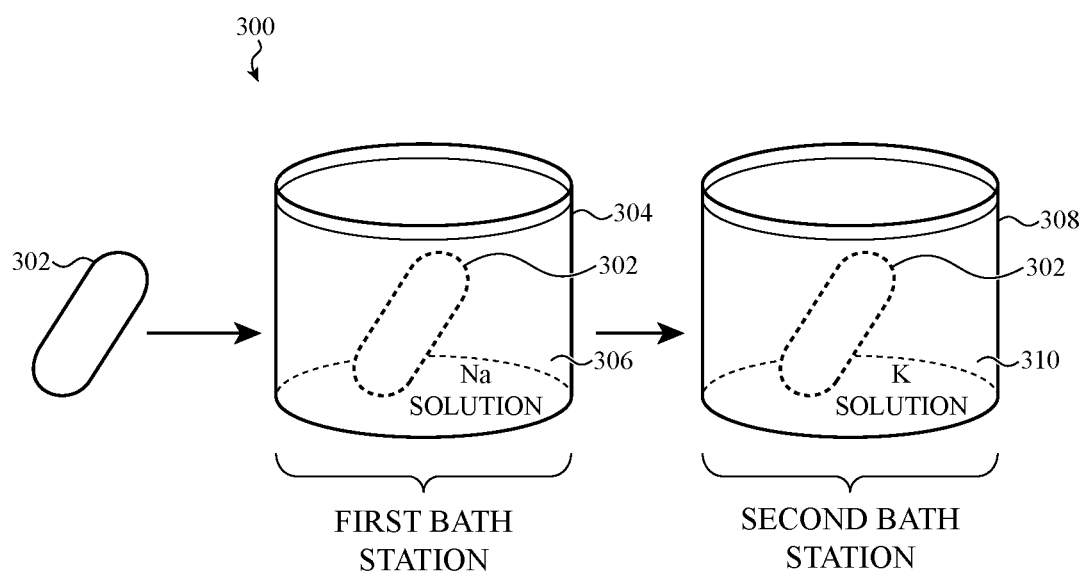
FIG. 3 shows a glass strengthening system in accordance with embodiments herein.
Figure 10:
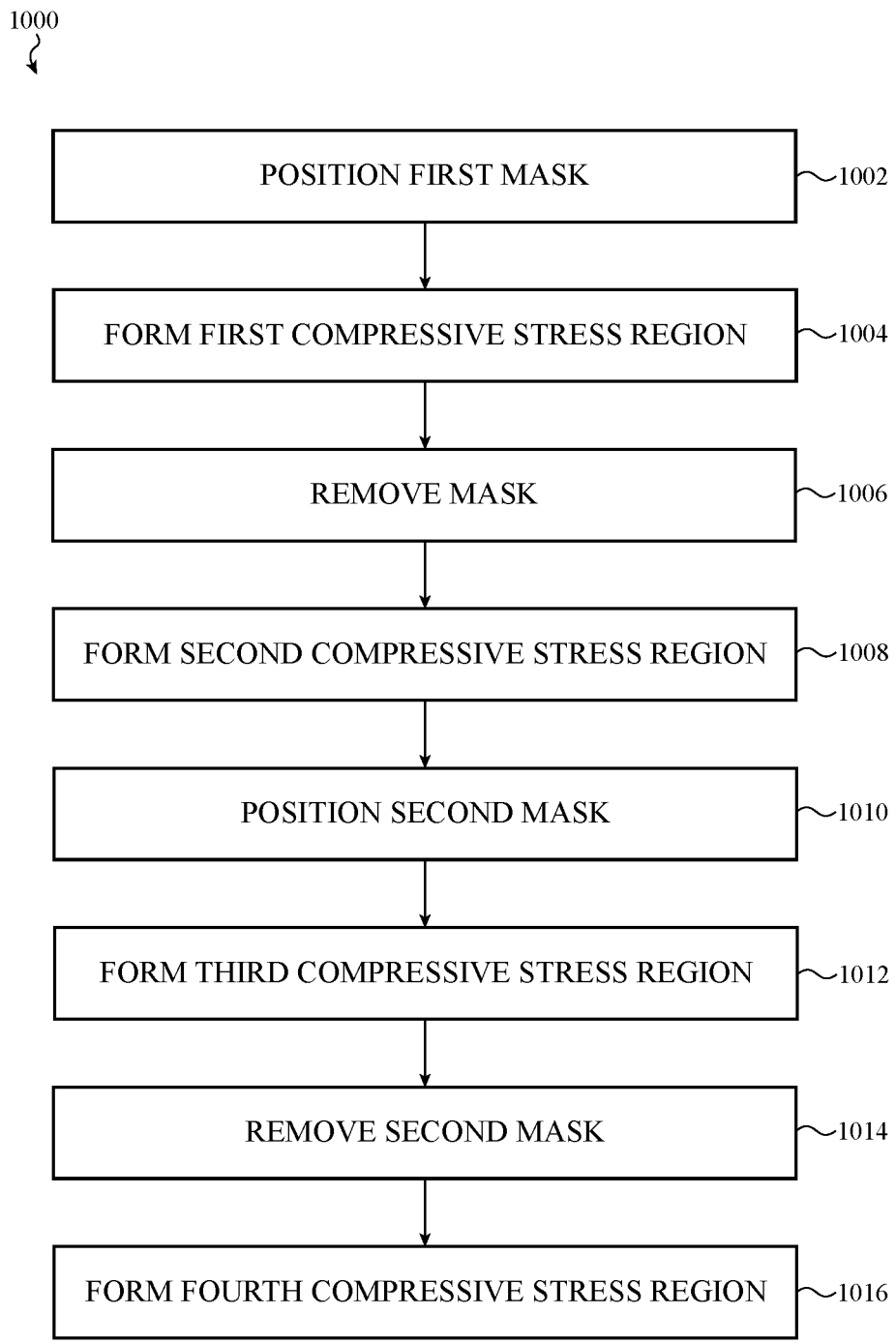
FIG. 10 depicts an example process for producing an asymmetrically strengthened glass article using a masking technique.

In embodiments, the operations of glass strengthening process 200 may include additional features of the present disclosure, such as features described with respect to FIGS. 3 and 10. Further, glass strengthening process 200 may include additional operations, such as masking operations.

FIG. 3 illustrates one embodiment for strengthening a glass article 300 in accordance with embodiments herein. A glass article 302 in need of glass strengthening is immersed in a first bath 304 that contains a sodium solution 306 comprising sodium ions. The enhanced strengthened glass article is then removed from the first bath 304 and immersed in a second bath 308 that contains a potassium solution 310 comprising potassium ions. In some embodiments, the strengthened glass article can be quenched to eliminate further exchange of ions from the treated glass article. In some cases, one or more surfaces of the glass article 302 are masked and/or have been treated to enhance or suppress ion exchange along a localized region. A glass article treated using this method of strengthening would have little or no warpage and have little or no control over the direction of impact initiated crack propagation.

The level of glass article enhancement is generally controlled by the type of glass (glass articles can, for example, be alumina silicate glass or soda lime glass, and the like); the sodium ion or sodium salt concentration of the bath (e.g., sodium nitrate, typically 30%-100% mol); the time the glass article spends in the bath (typically 4-8 hours); and temperature of the bath (350° C.-450° C.).

Strengthening of the glass article in the second bath is controlled by the type of glass, the potassium ion concentration, the time the glass spends in the solution, and the temperature of the solution. Here, the potassium ion or potassium salt concentration (e.g., potassium nitrate) is in the range of 30-100% mol, but the glass article would remain in the bath for about 6-20 hours at a bath temperature of between about 300° C.-500° C.

Generally, chemical strengthening processes rely upon ion exchange. In each solution or bath, the ions therein are heated to facilitate ion exchange with the glass article 302. During a typical ion exchange, a diffusion exchange occurs between the glass article 302 and the ion bath 304, 308. For example, sodium ions in the sodium solution 306 of the first bath 304 may provide an exchange enhancement process. In particular, the sodium ions may diffuse into the surface of the exposed glass, allowing a build-up of sodium ions in the surface of the glass. In embodiments, the sodium ions replace other ions found in a silicate (e.g., aluminosilicate) or soda lime glass. In embodiments, sodium ions may exchange for smaller lithium ions in the glass. The ion exchange during immersion in the first bath may take place at a first temperature below a glass transition temperature of the glass.

Upon immersion of the enhanced glass article 302 into the potassium solution 310 of the second bath 308, the sodium ions of the enhanced glass article 302 are replaced by potassium ions in surface areas to a greater extent than sodium ions found more toward the interior or middle of the glass article 302. The ion exchange during immersion in the second bath may take place at a second temperature below the glass transition temperature of the glass. After exchange of sodium ions in the glass for potassium ions, a compression layer is formed near the surface of the glass article 302 (for example, the larger potassium ions take up more space than the exchanged smaller sodium ions). The sodium ions that have been displaced from the surface of the glass article 302 become part of the potassium bath ion solution.

Depending on the factors already discussed above, a compression layer as deep as about 10-100 microns (μm), and more typically 10-75 μm, can be formed in the glass article 302. In some embodiments, a deeper compression layer may be formed, such as from 100 microns to 250 microns.

In general, the preparation of a compression layer may result in increased volume in targeted zones of the glass article 302, which can result in warpage of the glass article 302. Where the compression layer is prepared to a uniform or consistent depth over both surfaces of the glass article 302, warpage is of limited concern, as the ions will exert the same force over the entire surfaces of the glass article 302. Where asymmetric chemical strengthening is utilized, as discussed below, the ions exert a non-uniform force over the surfaces of the glass article 302, which can result in warpage or bending of various areas of the glass article 302. However, by using patterns of asymmetrically strengthened compression layers to strengthen different zones or regions of the glass article 302, flat surfaces can be maintained, and control of any impact damage away from priority areas of the glass can be accomplished. In general, patterns of compressive stress regions can be input into the glass article 302 to accomplish the strengthening aspects in the glass, while also used to oppose each other and limit warpage, and provide barriers to redirect, reduce, or prevent crack propagation.

Figure 4A:
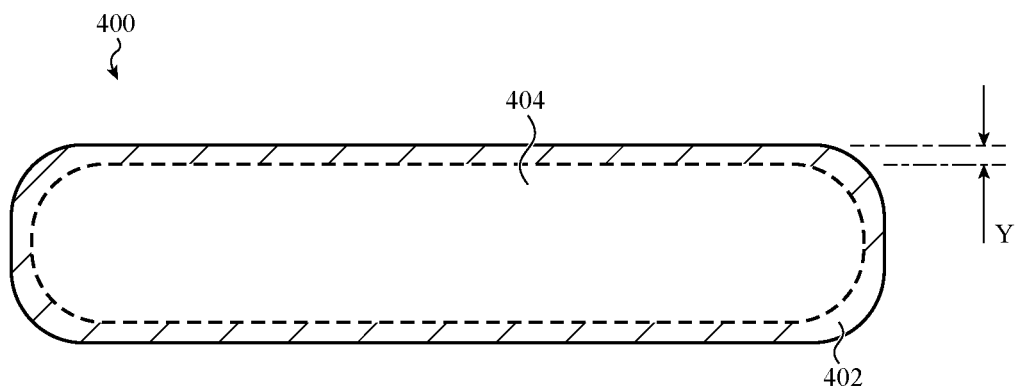
FIG. 4A is a cross-sectional diagram of a glass cover which has been symmetrically chemically treated.

FIG. 4A is a cross-sectional diagram of a glass article 400 which has been chemically treated such that a symmetrically chemically strengthened layer 402 is created. The glass article 400 includes a chemically strengthened layer 402 and a non-chemically strengthened inner portion 404. While discussed in greater detail throughout, the effect of chemically strengthening the glass article 400 as shown in FIG. 4A is that the inner portion 404 is under tension, while the chemically strengthened layer 402 is in compression. The chemically strengthened layer 402 has a thickness (Y) which may vary depending upon the requirements of a particular use. Note that the forces of the chemically strengthened layer 402 are uniform on the glass article 400 such that little or no warpage would occur.

While the simplified representation of the chemically strengthened layer 402 is depicted as having a uniform thickness, in accordance with embodiments described herein, the chemically strengthened layer 402 may be formed from a series of compressive stress regions, at least some of the compressive stress regions having a different thickness (or depth of layer). As described in more detail herein, the series of compressive stress regions may be distributed or positioned along the front and rear surfaces of the glass article 400 to help reduce or prevent warpage to produce a substantially flat glass article 400.

Figure 4B:
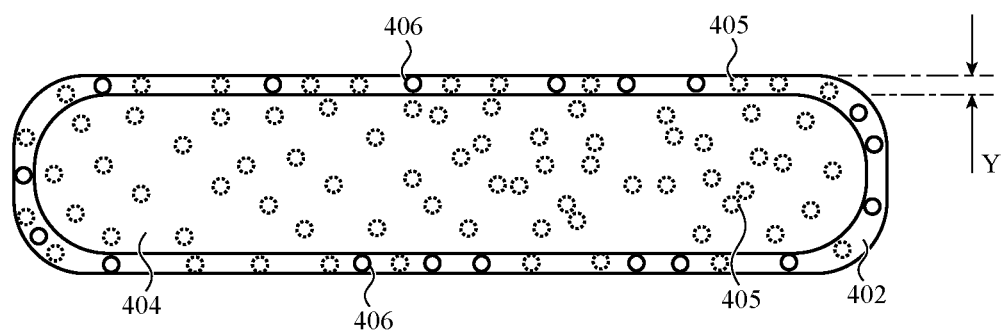
FIG. 4B is a cross-sectional diagram of a glass cover which has been symmetrically chemically treated, as shown to include a chemically treated portion in which potassium ions have been implanted.

FIG. 4B is a diagrammatic representation of a chemically strengthened process. Note that some amount of sodium 405 diffuses from the enhanced glass article to the ion bath, while potassium (K) ions 406 diffuse into the surface of the glass article, forming the chemically strengthened layer 402. Alkali metal ions like potassium, however, are generally too large to diffuse into the center portion of the glass article, thereby leaving the inner portion 404 only under tension and not in compression. By controlling the duration of the treatments, temperature of the treatments, and the concentration of the various ions involved in the treatments, the thickness (Y) of a chemically strengthened layer 402 may be controlled, as well as the concentration of ions in the chemically strengthened layer 402. Note that the concentration of the ions involved in the chemical strengthening process may be controlled by maintaining, during glass article treatment, a substantially constant amount of ions in each of the two baths (for example, as the potassium ions diffuse into the glass, a controller would add more potassium ions into the ion bath—thereby encouraging the potassium to continue to diffuse into the glass). The relationship between the chemically strengthened compression level (both ion concentration at the surface and depth) and the inner tension portion forms a stress pattern for a chemically treated glass article.

Additional ion bath immersions may be added to the basic glass chemical strengthening process. For example, a third bath including sodium ions (e.g. from sodium nitrate) can be used to immerse the strengthened glass so as to exchange potassium ions out of the compression layer for sodium ions in the third bath. This is referred to as a back-exchange or toughening process. The toughening process is used to further control the depth and strength of a compression layer, and, in particular, to remove some compression stresses from near the top surface regions, while allowing the underlying potassium ions to remain in the lower regions of the compression layer. In addition, the toughening process reduces the central tension from the glass article (see below).

Although sodium enhancement and potassium strengthening are described herein, other ion combinations are within the scope of the present disclosure, for example, use of lithium instead of sodium, or cesium instead of potassium, e.g., sodium-potassium, sodium-cesium, lithium-potassium, lithium-cesium treatment combinations. Any ion combination can be used herein that provides an increase in the glass article surface compression and compression depth.

Chemical strengthening is applied to glass surfaces, and relies upon exposure of the glass surface to the chemical strengthening process. Where a glass article is immersed such that all aspects of the article have equal exposure to the ion bath, the glass article surface will be symmetrically strengthened, allowing for a glass article with a uniformly thick and composed compression layer (Y) and little or no warpage.

In accordance with some embodiments described herein, a glass article surface may not be equally exposed to chemical strengthening resulting in a surface that is asymmetrically strengthened. More specifically, the techniques described herein allow for a glass article with a non-uniform compression layer while still maintaining flatness or reducing the potential for part warpage. As above, asymmetrically strengthened glass articles have a stress pattern; however, the stress pattern is modified based on the asymmetry of the chemical treatment and, as described in greater detail below, patterned asymmetric chemical strengthening is used to avoid glass article warpage, and thereby maintains substantially flat surfaces. Patterns of asymmetric chemical strengthening are therefore used to strengthen a zone of a glass article, avoid glass article warpage, and provide an impact pathway that avoids priority aspects or regions of the glass article.

Tools for Asymmetric Chemical Strengthening: Pre-Heating to Increase Glass Density Prior to Chemical Strengthening Chemical strengthening may be enhanced or facilitated by various thermal techniques that are performed prior to the chemical strengthening process. Chemical strengthening is limited by the saturation limit of the glass for an amount or volume of ions. The size, depth, and concentration of ions within a glass article directly relate to the characteristic strengthening for the glass which, as described herein, can be modified and calibrated throughout the glass to prepare the glass for a particular use.

At saturation, no additional compression layer or depth modifications may be accomplished (via diffusion). However, modification of thermal input to a glass article, prior to chemical strengthening, can allow for enhancement of the glass surface density, which will directly contribute to the concentration and depth of the strengthened compression layer.

Where a significant amount of thermal energy is added to a glass article prior to chemical strengthening, the glass density of the article can be increased. Glass density in these embodiments results in the glass lattice being heated to a point of densification. With regard to the embodiments described herein, localized densification can be used to produce asymmetric chemical strengthening. In particular, localized densification can increase or decrease susceptibility or sensitivity of a particular region to an ion-exchange process and, therefore, be used to create localized compressive stress regions having a distinct thickness or other characteristic.

Figure 5A:
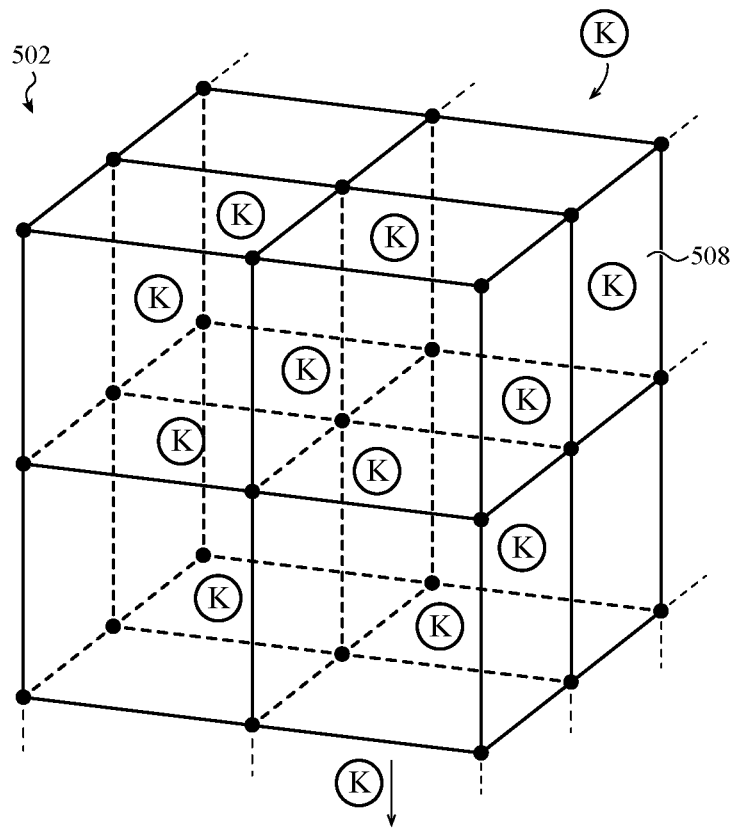
FIG. 5A is a diagram of a lattice structure for glass.
Figure 5B:
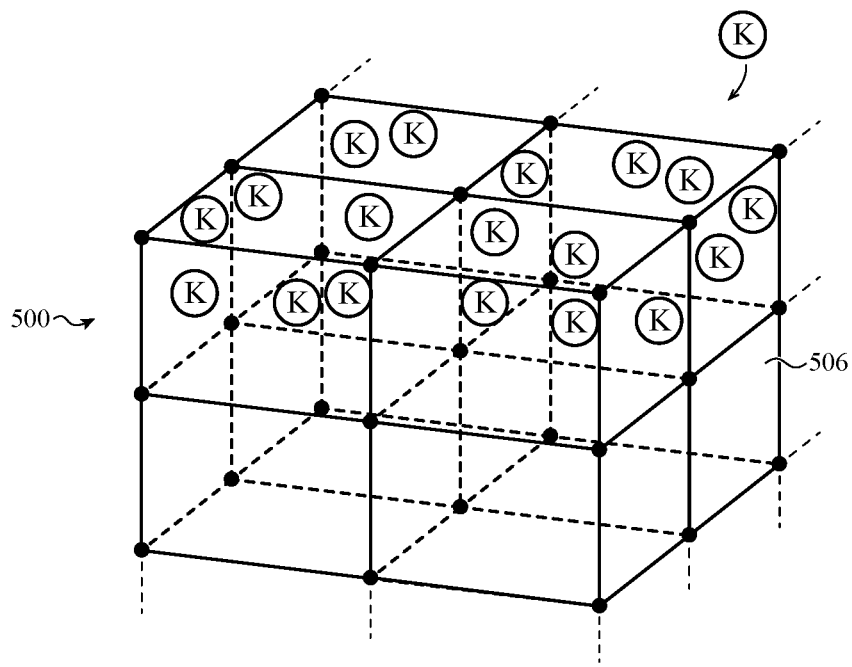
FIG. 5B is a diagram of a lattice structure for corresponding densified glass.

As schematically shown in FIG. 5A and FIG. 5B, denser glass (FIG. 5B) 500 provides a more limited lattice structure (more restricted and less flexible) and is less able to undergo ion diffusion to deeper levels than non-treated glass (FIG. 5A) 502. In FIGS. 5A and 5B, the glass has a starting glass lattice structure 502, which when heated to a densification temperature, is densified and provides a smaller volume 506 for ions to move through than the volume 508 of the non-densified glass 502. In an embodiment, the lattice structure is a network structure, such as a silicate-based network structure. For example, an aluminosilicate glass may have an aluminosilicate network structure. The restriction on the glass lattice allows for fewer ions to diffuse inwardly, while the concentration of ions in the chemical strengthening bath remains high (as compared to an ion bath used for non-densified glass). Also, although the glass lattice has been densified, embodiments herein do not result in thermal input to the point of crystal lattice collapse (not shown), rather as heat is applied to the point of lattice limitation, some ions are able to diffuse into the glass. The ions that do diffuse into the glass are tightly packed at the surface of the densified glass and thereby provide a superior surface compression layer of shallow depth.

As such, the increase in glass density at the start of the chemical strengthening process limits ion diffusion into the glass surface, allowing the glass to exchange a greater amount of ions at the surface of the glass, but only allowing the exchange to a shallow depth. Glass articles treated prior to chemical strengthening by initial thermal input typically express a higher chemical stress at the surface, but to a shallower depth. These glass articles are most useful for high compressive stress but to a shallow depth, e.g., an article where polishing or other like procedure is likely required on the chemically strengthened glass, or where the glass may be exposed to increased risk of scratching but not wear and tear (impact).

One such thermal technique is annealing a glass article prior to chemical strengthening. Annealing includes subjecting the glass article to a relatively high temperature in an annealing environment for a predetermined amount of time, and then subjecting the glass article to a controlled cooling for a second predetermined amount of time. Once annealed and chemically strengthened, the glass article will have a modified compressive stress as compared to similar glass articles not annealed prior to chemical strengthening. As noted above, annealing is particularly important where the glass article is in need of high surface compressive stress (but to a shallower depth).

The annealing process requires that the glass article be heated to a temperature between the strain point temperature and softening temperature of glass, also known as the annealing temperature (for aluminosilicate glass, the annealing temperature is between about 540° C.-550° C.). The time required to anneal a glass article varies, but is typically between 1-4 hours, and cooling times typically are on the order of ½° C./min for up to about 5 hours.

Typically, glass articles that have been annealed may be taken straight from a controlled cooling and immersed in the enhancement ion bath (sodium), or, alternatively, the article may be further air cooled, and then immersed in the first ion bath. Once annealed, the glass will resist deeper ion diffusion but allow some diffusion at the surface. The diffusion into the surface allows for high compression stress (with shallow depth).

A second thermal technique used to raise a glass article's density prior to chemical strengthening is hot isostatic pressing or HIP. HIP includes simultaneously subjecting the glass article to heat and pressure for a predetermined amount of time in an inert gas. The glass article is allowed to remain in the HIP pressure vessel until the glass article is denser, where internal voids in the glass are limited. As for annealing, the increase in glass density prior to chemical strengthening by HIP allows for the production of a higher compression stress at the glass article surface, but to a shallower depth (than would be expected for a glass article that does not undergo HIP).

HIP parameters vary, but an illustrative process would involve placing the glass article to be chemically strengthened in a HIP pressure vessel, drawing a vacuum on the vessel, and applying heat to the glass article in the vessel. Under pressure, the vessel may be heated to 600-1,450° C., depending on the type and thickness of the glass. Heat and pressure are typically maintained for about 10-20 minutes, after which the processed glass is allowed to cool. In some embodiments, a suitable inert gas can be introduced in the vessel to facilitate heating of the glass article. HIP is another tool for modifying or enhancing the chemical strengthening process.

Figure 6:
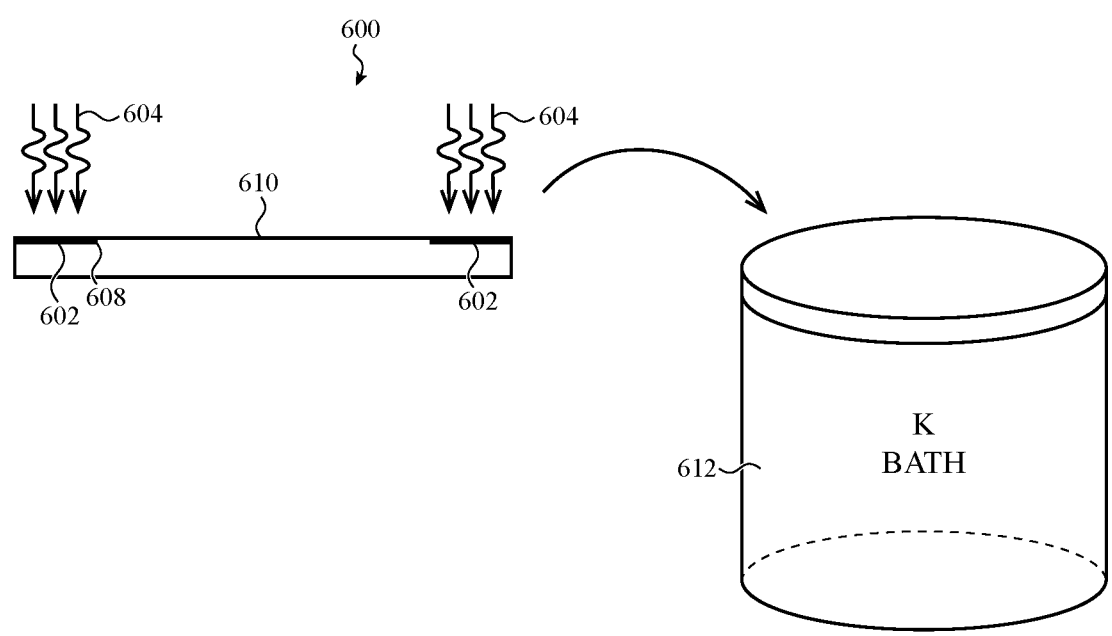
FIG. 6 is a diagram of a partial cross-sectional view of a glass cover, which shows two zones of densified glass.

As shown in FIG. 6, the pre-heating of the glass article 600 can be localized (and not across the entire surface(s) of the glass article), such that target or predetermined regions 602 of the glass article are densified. In this embodiment, localized heating (shown as arrows 604) is performed prior to chemical strengthening and to a point between the strain point temperature and softening temperature of the glass. Laser or inductive coil heating can be used to pre-heat the location and thereby provide a glass article that includes both densified 608 and non-densified glass surfaces 610. FIG. 6 shows a simple cross-section of a glass cover 600 where the sides have been locally pre-heated to form densified glass 608, while the center of the glass article exhibits non-densified glass 610.

Embodiments herein include glass articles pre-treated by heating techniques to form densified glass over an entire surface, or in predetermined regions or locales, leaving regions of different glass density. When a glass article so treated is chemically strengthened 612, the article will be asymmetrically strengthened and have an asymmetric stress pattern, where densified glass exhibits a higher surface compression stress, but to a shallower depth, than corresponding non-densified glass. It is envisioned that the timing and placement of the pre-heating can be used to optimize a glass surface compressive stress and the depth of the compressive stress.

Although not explicitly noted in all embodiments herein, all glass article embodiments herein may include the use of glass articles that have been pre-heated to densify the glass prior to chemical strengthening. As noted above also, so treated glass may exhibit warpage due to the asymmetric strengthening of densified and non-densified glass, essentially allowing for production of different regions with different levels and depths of stress.

Stress Profiles

Chemically treating a glass article in accordance with embodiments herein effectively strengthens the exposed or treated surfaces of the glass. Through such strengthening, glass articles can be made stronger and tougher so that thinner glass can be used in portable electronic devices.

Figure 7A:
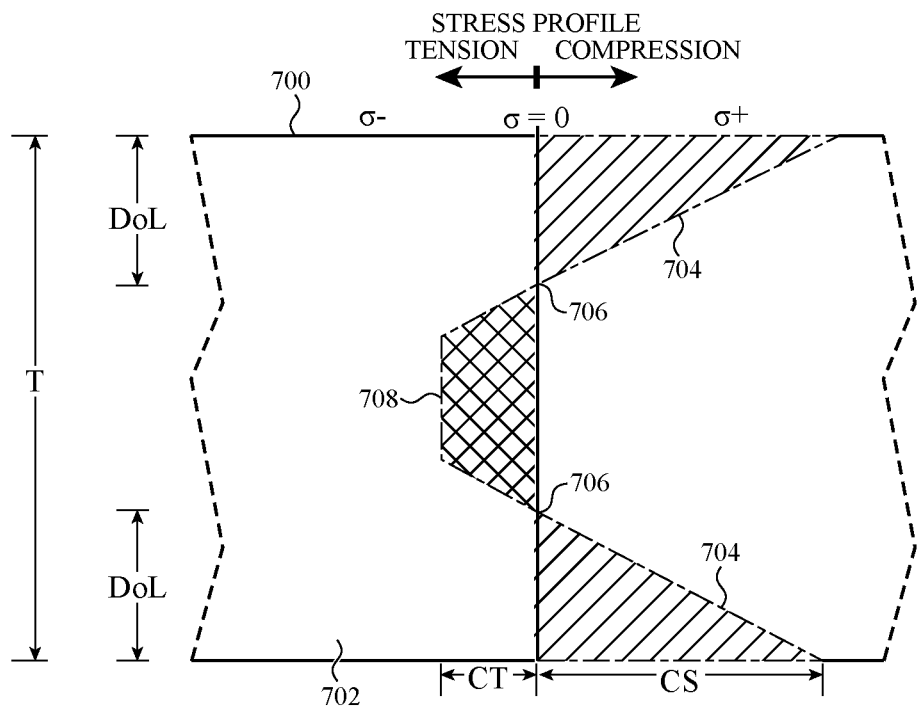
FIG. 7A is a diagram of a partial cross-sectional view of a glass cover, which shows a tension/compression stress profile in accordance with embodiments herein.

FIG. 7A is a diagram of a partial cross-sectional view of a glass article, for example a cover glass. The diagram shows an initial tension/compression stress profile according to one embodiment. The initial tension/compression stress profile may result from an initial exchange process to symmetrically strengthen the surface region of the glass. *A minus sigma legend indicates a profile region of tension, while a plus sigma legend indicates a profile region of compression. The vertical line (sigma is zero) designates crossover between compression and tension.

In FIG. 7A, thickness (T) of the cover glass is shown. The compressive surface stress (CS) of the initial tension/compression stress profile is shown at the surface of the cover glass. The compressive stress for the cover glass has a compressive stress layer depth (DoL) that extends from surfaces of the cover glass towards a central region. Initial central tension (CT) of the initial tension/compression stress profile is at the central region of the glass cover. In embodiments, the tension/compression stress profile (or stress profile) extends across the thickness of the glass. In further embodiments, only the compression portions of the stress profile (or compressive stress distributions) may be determined.

As shown in FIG. 7A, the initial compressive stress has a profile with peaks at the surfaces 700 of the cover glass 702. That is, the initial compressive stress 704 is at its peak at the surface of the glass cover. The initial compressive stress profile shows decreasing compressive stress as the compression stress layer depth extends from surfaces of the glass cover towards the central region of the glass cover. The initial compressive stress continues to decrease going inwards until crossover 706 between compression and tension occurs. In FIG. 7A, regions of the decreasing profile of the initial compressive stress is highlighted using right-to-left diagonal hatching.

The peaks at the surface of the cover glass provide an indication of the bending stress a cover glass can absorb prior to failure, while the depth of the compressive stress region provides protection against impact. After crossover between compression and tension, a profile of the initial tensile stress region 708 extends into the central region shown in the cross-sectional view of the cover glass. In the diagram, FIG. 7A, regions of the decreasing profile of the tensile stress region (CT) extending into the central region is highlighted using hatching.

Typically the combinations of stresses on a glass article are budgeted to avoid failure and maintain safety. For example, if you put too much compressive stress into a glass article, the energy will eventually cause the article to break or fracture. Therefore, each glass article has a stress budget, an amount of compressive versus tensile strength that provides a safe and reliable glass article. In FIG. 7A, the compressive stress on the glass article is fairly balanced on the top (front) surface and bottom (rear) surface and equal to the tensile stress. As such, the glass article will avoid or have very limited to no warpage.

Figure 7B:
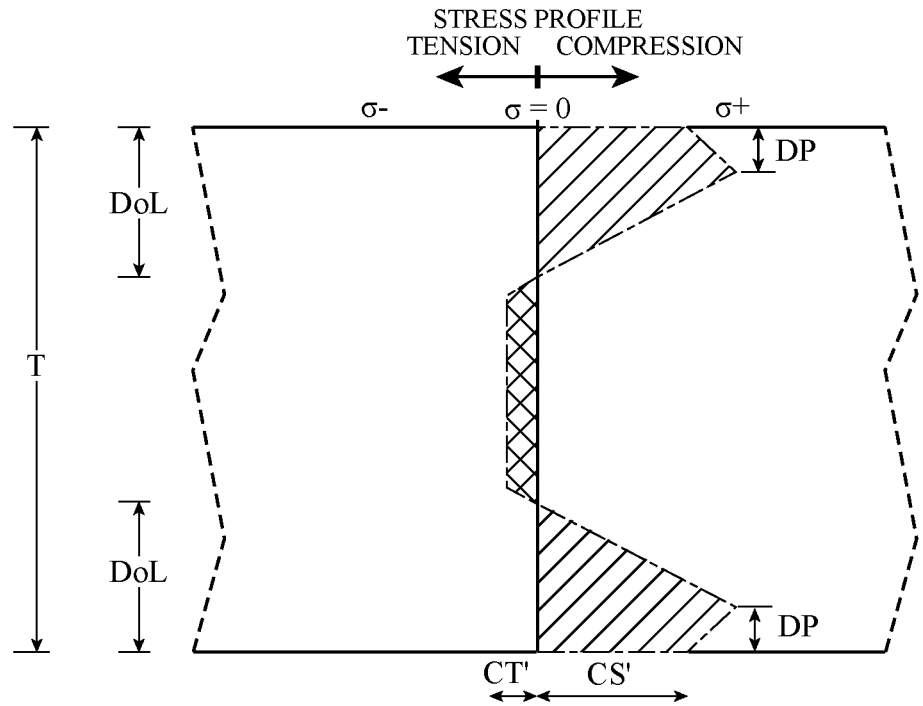
FIG. 7B is a diagram of a partial cross-sectional view of a glass cover, which shows a reduced tension/compression stress profile in accordance with embodiments herein.

FIG. 7B is a diagram of a partial cross-sectional view of a cover glass, which shows a reduced tension/compression stress profile according to one embodiment. The reduced tension/compression stress profile may result from a double exchange process. Reduced compressive surface stress (CS') of the reduced tension/compression stress profile is shown in FIG. 7B. The compressive stress layer depth (DoL) now corresponds to the reduced compressive stress. In addition, reduced central tension is shown in the central region.

In light of FIG. 7B, it should be understood that the reduced compressive surface stress (CS') shows increasing profiles as the compressive surface layer depth extends from surfaces of the cover glass and towards the submerged profile peaks. Such increasing profiles of compressive stress may be advantageous in arresting cracks. Within a depth (DoL) of the submerged peaks, as a crack attempts to propagate from the surface, deeper into the cover glass, it is met with increasing compressive stress (up to DP), which may provide crack arresting action. Additionally, extending from the submerged profile peaks further inward toward the central region, the reduced compressive stress turns to provide a decreasing profile until crossover between compression and tension occurs. As in FIG. 7A, the reduced compressive stress is symmetric and avoids warpage at the surfaces of the glass article.

FIGS. 7A and 7B show a symmetric stress profile at a particular location within the glass article, where both sides (front and rear) of the cover glass have equal compressive stress, compressive stress layer depth, and tensile stress. While portions of a glass article may have a symmetric profile, other regions or areas of the glass article may have an asymmetric profile, which may help to create crack diversion or localized strengthened zones within the glass article.

Figure 7C:
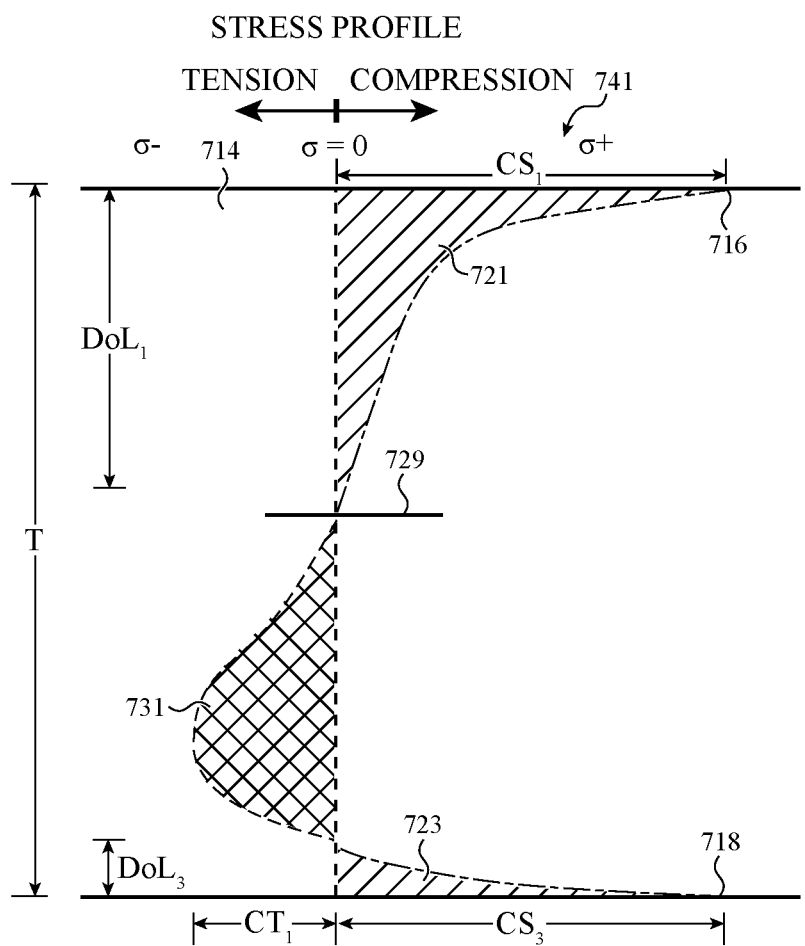
FIG. 7C is a diagram of a partial cross-sectional view of a glass cover, which shows an asymmetric tension/compression stress profile in accordance with embodiments herein.

FIG. 7C shows an asymmetric stress profile for a first zone 741 of a cover glass 714 where the front surface 716 shows a more significant compressive stress region 721 having depth ($DoL_1$) than the compressive stress region 723 having depth ($DoL_3$) from the rear surface 718. Note that the front surface 716 would, in this case, be more durable and impact resistant than the rear surface. Also note that there is a stress budget; the inclusion of additional compressive stress on the front surface may be compensated for by a much shallower depth of compression on the rear surface.

As shown in FIG. 7C, the increased depth of the compressive stress region 721 along the front surface 716 results in a tensile stress region 731 that is offset with respect to the centerline 729 of the cover glass 714. In particular, the tensile stress region 731 is offset away from front surface 716 or toward the rear surface 718. The distribution of tensile stresses in tensile stress region 731 need not be uniform, as schematically shown in FIG. 7C. In embodiments, the maximum value of the tensile stress ($CT_1$) in tensile stress region 731 is also offset with respect to the centerline 729 (away from the front surface 716 and towards the rear surface 718). In embodiments, a centerline of the tensile stress region may be halfway between the cross-over points between compression and tension.

To facilitate a downward shift of the tensile stress region 731, the compressive stress region 723 along the rear surface may be thinner or have a reduced depth as compared to the thickness or depth of the compressive stress region 721 along the front surface 716. For example, $DoL_3$ may be from 5 microns to 50 microns or greater than 20 microns to 50 microns while $DoL_1$ may be from 100 microns to 250 microns. Creating a thinner compressive stress layer can reduce the integral of the tensile stress over tensile stress region 720, which may enhance the reliability of the cover glass 714.

In embodiments, the maximum compressive stress $CS_1$ of compressive stress region 721 (along the front surface) is greater than the maximum compressive stress $CS_3$ of the compressive stress region 723 (along the rear surface). The maximum compressive stress of the compressive stress regions may be located at the surface of the cover glass. As examples, the maximum compressive stress $CS_1$ may be from 600 MPa to 800 MPa and the maximum compressive stress $CS_3$ may be from 300 MPa to less than 600 MPa, greater than 400 MPa to less than 600 MPa, or from 450 MPa to less than 700 MPa. In further embodiments, $CS_1$ of compressive stress region 721 (along the front surface) is about equal to the maximum compressive stress $CS_3$ of the compressive stress region 723 (along the rear surface).

Figure 7D:
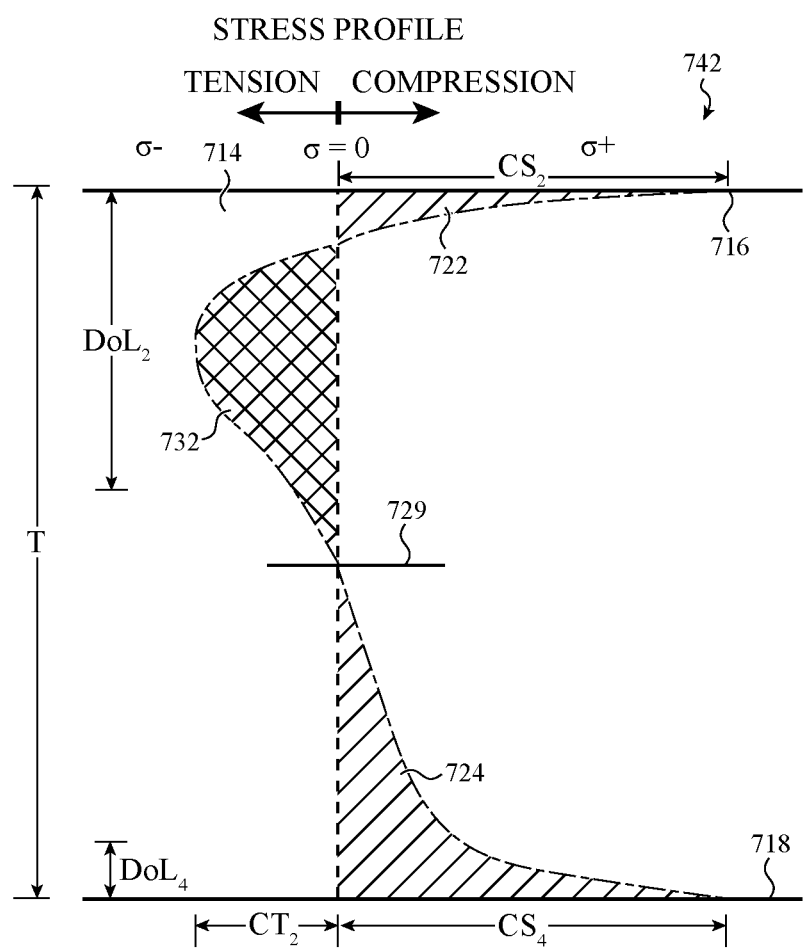
FIG. 7D is a diagram of a partial cross-sectional view of a glass cover, which shows an alternative asymmetric tension/compression stress profile as shown in FIG. 7C, and in accordance with embodiments herein.

As described in more detail below with respect to FIGS. 15A-15D, asymmetric stress regions may be located adjacent to each other in order to help balance the internal stress and help maintain part flatness or reduce warpage. In particular, and as shown in FIG. 7D, an adjacent zone 742 may include a thinner compressive stress region 722 near the front surface 716 and a thicker compressive stress region 724 along the rear surface 718. This complementary stress pairing, if located adjacent to the asymmetric profile depicted in FIG. 7C, may help balance the internal stresses. For example, the asymmetry of compressive stress in zone 742 may at least partially counteract the asymmetry of compressive stress in zone 741 and reduce warping of the cover glass.

In some cases, the adjacent zone 742 will have a tensile stress region 732 that is offset from the centerline 729 of the cover glass 714 in a direction opposite to the direction of offset of the tensile stress region 731 of FIG. 7C. Specifically, the adjacent zone 742 will have a tensile stress region 732 that is offset from the centerline 729 in a direction which is upwards or toward the front surface 716. Similarly, the maximum value of the tensile stress ($CT_2$) in tensile stress region 732 is also offset with respect to the centerline 729 (towards the front surface 716 and away from the rear surface 718). These offset tensile stress regions may further facilitate the reduction of crack propagation through the pair of zones. For example, a crack which begins to propagate from front surface 716 in zone 742 may tend to remain in zone 742 if the compressive stress in compressive stress region 722 is less than the compressive stress at an equivalent depth in compressive stress region 721. In addition, if the crack propagates beyond compressive stress region 722, the crack may tend to remain in tensile stress region 732 rather than enter compressive stress region 721 or a comparatively low tension portion of tensile stress region 731. In some embodiments, $CT_1$ is about equal to $CT_2$, while in additional embodiments $CT_1$ may differ from $CT_2$.

The depth of layer $DoL_2$ of compressive stress region 722 may be from 5 microns to 50 microns or greater than 20 microns to 50 microns while the depth of layer $DoL_4$ of compressive stress region 724 may be from 100 microns to 250 microns. In embodiments, the maximum compressive stress $CS_4$ of compressive stress region 724 (along the rear surface) is greater than the maximum compressive stress $CS_2$ of the compressive stress region 722 (along the front surface). The maximum compressive stress of the compressive stress regions may be located at the surface of the cover glass. As examples, the maximum compressive stress $CS_4$ may be from 600 MPa to 800 MPa and the maximum compressive stress $CS_2$ may be from 300 MPa to less than 600 MPa, greater than 400 MPa to less than 600 MPa, or from 450 MPa to less than 700 MPa. In further embodiments, $CS_2$ of compressive stress region 722 (along the front surface) is about equal to the maximum compressive stress $CS_4$ of the compressive stress region 724 (along the rear surface).

As will be discussed in greater detail below, design and production of cover glass having modified stress profiles like FIGS. 7C and 7D for calibrated utility are accomplished by using patterned asymmetric chemical strengthening processes described herein. By asymmetrically strengthening a cover glass exhibiting target patterns, highly useful cover glass may be produced. In such instances, the stress pattern for any zone or region of the cover glass may be used to provide a stress profile, and, therefore, cover glass, having an optimized surface for its utility. By combining stress profiles in specific patterns at different zones or regions of the cover glass, cover glass having the appropriate strength, and lack of warpage for a particular use, can be prepared. In addition, targeted asymmetric strengthening can be used to direct impact failure toward less prioritized areas or regions of the cover glass, for example, by providing a path of patterned asymmetric strengthening from regions of likely impact, to propagate to an area in the cover glass having lower priority, i.e., where a crack has a lower capacity to interfere with the overall utility of the cover glass.

Asymmetric Chemical Strengthening

Embodiments herein result in the production of asymmetrically strengthened glass articles showing various patterns that have little to no glass warpage and facilitate glass cracking patterns to avoid priority regions of the glass article. Asymmetrically strengthened glass articles, for example, cover glass, using patterns described herein, can be designed to be more reliable, damage resistant, flat, and safer than corresponding symmetrically strengthened or asymmetrically strengthened glass articles.

Figure 8:
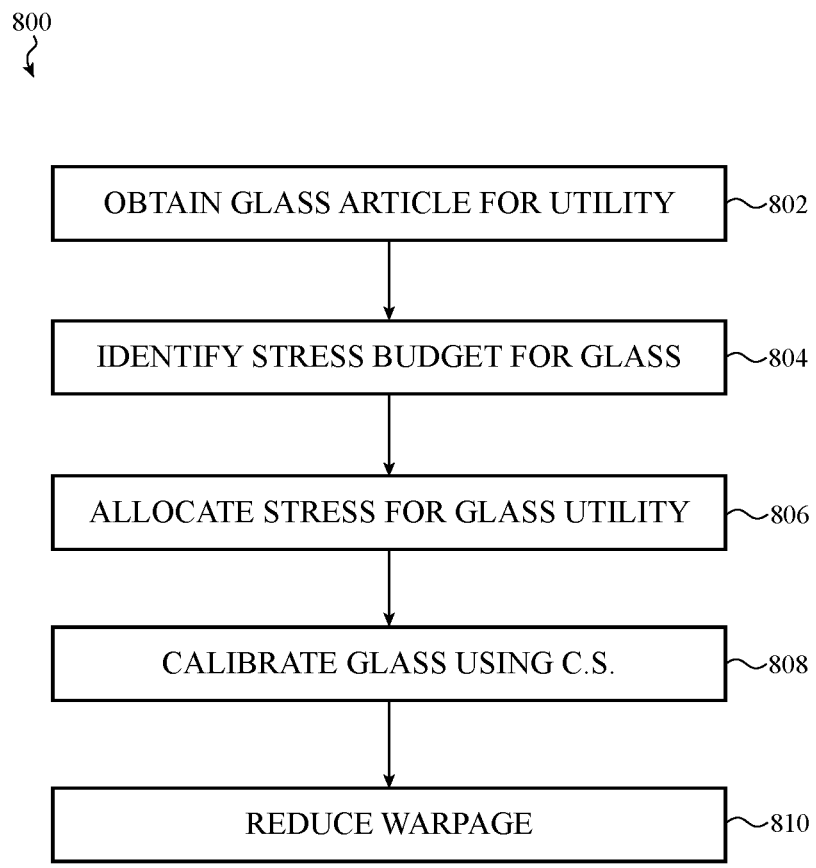
FIG. 8 is a flow diagram of asymmetric glass strengthening in accordance with embodiments herein.

FIG. 8 shows an illustrative flow diagram for asymmetrically strengthening a glass article 800. In particular, FIG. 8 depicts a process that can be used to produce or design an asymmetrically strengthened glass article. In operation 802, a glass article is identified for a desired utility based on its dimensions, its thickness, and its inherent composition. In operation 804, a budget for how much stress the identified glass can withstand is determined based on the utility of the glass, and a budget determined for optimal reliability and safety for the glass. For example, the stress budget may include balancing an amount of stress in the glass to provide both strength and safety 806. In operation 808, the glass article is then calibrated to exhibit a useful stress pattern so as to maximize the stress budget and utility through use of asymmetric chemical strengthening. As part of the calibration and in operation 810, the pattern is also designed to result in the stress being balanced to allow for reduction and/or elimination of substantially all warpage in the glass article, and to provide one or more impact pathways away from high priority regions of the glass article (e.g., to facilitate crack propagation to regions of the glass article having less of an impact on the utility of the glass). Patterns are therefore designed by identifying regions where chemical strengthening is required and corresponding zones on the same or opposing surfaces that can be used to oppose the bending forces and thereby result in a net cancelling out of surface bending. Regions can also be incorporated to provide lower barriers to a propagation crack, such that high impact areas have release regions or pathways to direct a crack away from a particular region (e.g., a transparent window) of the glass.

For example, a piece of thin cover glass positioned over a display of a portable electronic device optimally requires different properties over its two surfaces, front and rear. Asymmetry of the chemical strengthening may be required on the front- versus the rear-side of a cover glass, on the perimeter versus the center of a cover glass, around features in a cover glass, and in hard-to-polish areas in a cover glass. However, as discussed above, each cover glass has a stress pattern to avoid failure, where the compressive stress and tensile stress must be roughly balanced. As such, asymmetric chemical strengthening is used to optimize the properties of a particular cover glass, within the stress budget of the cover glass, for a particular use. In addition, the pattern of compressive stress regions to tensile stress regions is also patterned to facilitate and substantially reduce or eliminate warpage, and to provide crack propagation pathways to avoid a crack moving into a region where the cover glass would be considered a failure.

In general, patterns of asymmetric chemical strengthening can be used to provide a higher (or lower) surface compression region to a deeper (or shallower) depth, for a particular region, while opposing that surface compression layer with opposing stress to maintain a cover glass having little or no warpage, and useful crack or impact release pathways away from prioritized zones on the glass article. In embodiments, the relationship of the compressive stress regions (amount and depth) on the front and rear surfaces of a cover glass in relationship to the resultant tensile stress regions gives a stress pattern for the cover glass. The stress pattern can be along the X, Y, or Z axis of the cover glass. In embodiments, the stress pattern has a lateral component (e.g., along the X and/or Y axis) as well as a thickness component (e.g., along the Z axis). Forces exerted in the cover glass are used to oppose each other and provide substantially flat surfaces.

For example, a cover glass can have a front surface and a rear surface opposite to the front surface. A first compressive stress region extends into the cover glass from the front surface to a first depth. A second compressive stress region extends into the cover glass from the front surface to a second depth, the second depth being less than the first depth. A third compressive stress region extends into the cover glass from the rear surface toward the first compressive stress region, and the third compressive stress region has a third depth. A fourth compressive stress region extends into the cover glass from the rear surface toward the second compressive stress region to a fourth depth, and the fourth depth is greater than the third depth. The combination of the four compressive stress regions, each having an independent depth, can be used to both strengthen the cover glass, as well as to keep the front and rear surfaces flat.

As such, in embodiments herein, asymmetric chemical strengthening of a glass article is provided to: increase the reliability of a glass article for a particular use; increase the safety of a glass article for a particular use; facilitate flat or substantially flat surfaces of a glass article; provide crack propagation pathways for reducing the effect of an impact; and other like utilities.

Figure 9:
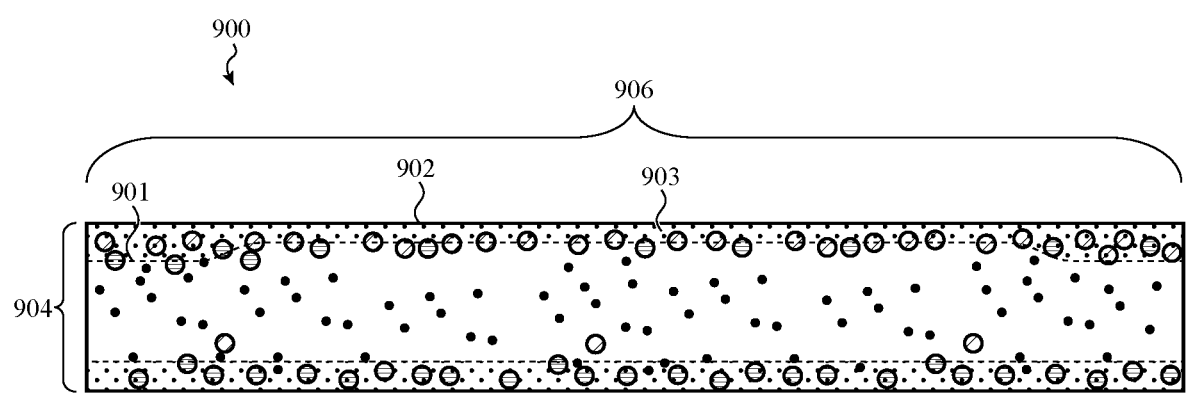
FIG. 9 is a cross-sectional diagram of a glass cover which has been asymmetrically chemically treated.

FIG. 9 shows that asymmetric chemical strengthening, in general, is dependent on differentially incorporating ions into a surface of a glass article, like a cover glass. As noted above, a cover glass 900, along any surface area 902, can exchange and incorporate ions to a particular depth and concentration based on the density and overall ion saturation point of the cover glass. In general, there is only so much volume in the glass that can be involved in the exchange to larger-sized ions so as to increase the compression of the glass (see 901 versus 903). The change in ion concentration along the surface, and to particular depths, modifies the internal stress relationship of the glass, and this relationship extends across the thickness of the glass 904, as well as throughout the interior portion of the glass (how the internal tension/compression stress changes across the middle of the glass article) 906. As such, and as discussed previously, a stress pattern can be across the thickness of a glass article (vertical—top to bottom surface) 904 as well as across or throughout the glass article (horizontal—side to side) 906.

Embodiments herein utilize these stress relationships to calibrate utilities to provide modified glass articles for use in portable electronic devices and small form factor devices. In addition, these stress relationships can be used to avoid warpage in the glass article, and to provide pathways for crack propagation away from prioritized regions of the glass article. Surprisingly, the combination of glass strengthening can accomplish all three priorities: strengthening of the glass, avoidance of warpage in the glass, and capacity to direct impact damage away from prioritized regions in the glass.

Patterns of Asymmetric Strengthening Via Masking or Coating

Embodiments herein include the application of masking or ion-diffusion barriers to portions of a glass article prior to immersion in the ion containing baths. For example, a portion of the glass surface can be physically masked from the ions in the chemical strengthening process via a diffusion of impermeable material, such as a metal or ceramic, sealed over the region where diffusion is not wanted. This type of physical masking can partially or completely limit ion-diffusion into that surface and provides asymmetric strengthening, i.e., the masked surface will receive little to no ion exchange as compared to the other exposed surfaces of the glass article. Once chemically treated, the physical barrier would typically be removed from the glass article. Here you would have treated and untreated surfaces. The application of masking and/or ion-diffusion barriers can be used to apply a pattern to a region or regions in the glass article.

In aspects, the methods described herein comprise two ion-exchange operations, with the mask(s) being removed from the article between the two ion-exchange operations. The two ion-exchange operations may take place in two different ion-exchange baths. In additional aspects, the mask is removed from the article after multiple ion-exchange operations are performed.

FIG. 10 depicts an example process 1000 for producing an asymmetrically strengthened glass article using a masking technique. In particular, the process 1000 can be used to create adjacent zones having opposing asymmetrical chemical strengthening. In accordance with the embodiments described herein, the adjacent zones may help to control crack propagation while also helping to maintain a flat part with a reduced tendency to warp or bend due to the asymmetric internal stresses.

In operation 1002, a first mask is positioned along a first surface of a glass article. If the glass article is a cover glass, the first surface may define at least a portion of an external surface of the electronic device. The first mask may form a coating over a portion of the first surface, such as a front surface of the cover glass. The first mask may be a mask similar to as shown below with respect to FIG. 11A. Other masking examples are described below with respect to FIGS. 11B, 14A-14C, 15A, 16A, 16B, and 18A-18F. In embodiments, a first portion of the first surface remains uncoated by the first mask and a second portion of the first surface is coated by the first mask.

In operation 1004, a first compressive stress region is formed along the first surface by exchanging ions into the cover sheet. The first compressive stress region has a first thickness (or depth of layer). For example, the first compressive stress region may be formed along the first portion of the first surface. Operation 1004 may be performed in accordance with any of the ion-exchange processes or techniques described herein. For example, the ion-exchange process described with respect to FIGS. 2 and 3 may be used to perform operation 1004. However, other known ion-exchange techniques may also be used. The ion exchange may be a single ion exchange or it may involve a series of ion exchanges. In embodiments, the ion exchange of operation 1004 may comprise exchange of ions in the glass (e.g., lithium ions) for sodium ions in a first bath. In embodiments, the first bath may comprise a sodium salt at a concentration greater than 50% mol. In additional embodiments, the first bath may further comprise additional alkali metal ions in a lesser amount.

In operation 1006, the first mask is removed. The first mask may be removed using a solvent and/or mechanical technique. In operation 1008, a second compressive stress region adjacent to the first compressive stress region may be formed by exchanging ions into the cover sheet so that the second compressive stress region has a second thickness that is less than the first thickness. For example, the second compressive stress region may be formed along the second portion of the first surface. Furthermore, the first compressive stress region formed in operation 1004 may be modified by additional ion exchange during operation 1008. Similar to operation 1004, any one of the previously described ion-exchange techniques may be used to perform operation 1008. The time, temperature, ion concentration, or other characteristic or parameter of the ion-exchange process may be modified in order to produce the desired second thickness. In embodiments, the ion exchange of operation 1008 may comprise exchange of sodium ions in the glass for potassium ions in a second bath. In further embodiments, lithium ions present in the glass may also be exchanged for potassium ions. In embodiments, the second bath may comprise a potassium salt at a concentration greater than 50% mol. In additional embodiments, the second bath may further comprise additional alkali metal ions in a lesser amount.

In operation 1010, a second mask is positioned along a second surface that is opposite to the first surface. The second mask may form a coating over a portion of the second surface, such as a rear surface of the cover glass. The second mask may be similar or may differ in shape and/or size from the first mask. In embodiments, the second mask may be offset with respect to the first mask. As examples, the second mask may only partially overlap the first mask or the second mask may not overlap the first mask. The second mask may be a mask similar to as shown below with respect to FIG. 11B. Other masking examples are described below with respect to FIGS. 11A, 14A-14C, 15A, 16A, 16B, and 18A-18F. In embodiments, a first portion of the second surface remains uncoated by the second mask and a second portion of the second surface is coated by the second mask. In additional embodiments, the first portion of the second surface is offset with respect to the first portion of the first surface and the second portion of the second surface is offset with respect to the second portion of the first surface. In operation 1012, a third compressive stress region is formed that extends from the second surface toward the second compressive stress region and has a third thickness. For example, the third compressive stress region may be formed along the first portion of the second surface. Operation 1012 may be similar to the ion-exchange operation used to perform operation 1004. In embodiments, the ion exchange of operation 1012 may comprise exchange of ions in the glass (e.g., lithium ions) for sodium ions in a bath.

In operation 1014, the second mask is removed. Operation 1014 may be similar to operation 1006. In operation 1016, a fourth compressive stress region is formed that extends from the second surface toward the first compressive stress region and has a fourth thickness that is less than the third thickness. For example, the fourth compressive stress region may be formed along the second portion of the second surface. Furthermore, the third compressive stress region formed in operation 1012 may be modified by additional ion exchange during operation 1014. Operation 1016 may be performed in a similar fashion to as described above with respect to operation 1008. In embodiments, the ion exchange of operation 1016 may comprise exchange of sodium ions in the glass for potassium ions in a bath. In further embodiments, lithium ions present in the glass may also be exchanged for potassium ions.

The above operations may be repeated multiple times in order to achieve the desired stress distribution throughout the glass article. It is not necessary that all of the operations be performed in the sequence described above and, in some cases, various operations may be combined or performed simultaneously or during an overlapping time period. For example, the first and second masks could be applied and the first and third compressive stress regions could be performed using the same bath or ion-exchange process. Similarly, the masks could be removed and the second and fourth compressive stress regions could be performed using the same bath or ion-exchange process. If operations are not to be performed simultaneously, additional masks may be employed. For example, the second surface may be masked during operations 1004 and 1008 and the first surface may be masked during operations 1012 and 1016.

Figure 11A:
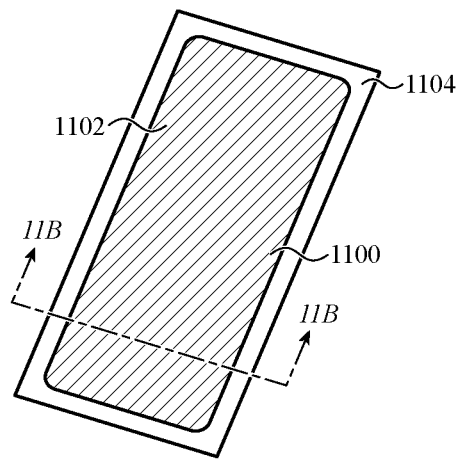
FIG. 11A depicts a top surface of a cover glass having a silicon nitride coating applied to the center portion, while the edge and corner portions remain uncoated.
Figure 11B:
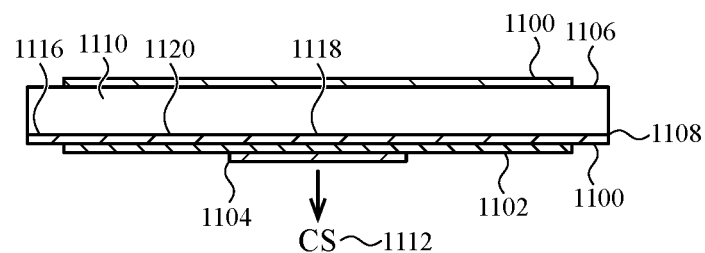
FIG. 11B is a cross-sectional diagram of a glass cover having a combination of coatings applied to the top and bottom surfaces, the cross-section shown through the cover glass of FIG. 10.

FIGS. 11A-11B depict example masking techniques and a resulting glass article. In one embodiment, as shown in FIG. 11A, a coating or film composed on silicon nitride (e.g., SiN, $SiN_x$, or $Si_3N_4$), or other like material, is used instead of a physical mask. In FIG. 11A, a coating 1100 is applied to the central portion of a cover glass 1102, while the edges and corners 1104 are left uncoated. Such a coating would limit or eliminate ion diffusion at the center region or portion of the cover glass, while allowing chemical strengthening at the non-coated regions (edges and corners). In an alternative embodiment, a coating or mask can be applied to the central portion and edges (a first surface), while leaving each of the four corners exposed. Chemical strengthening at the non-coated regions (four corners) would occur. A second mask could then cover the four corners (a second surface), followed by chemical strengthening.

The coating or mask is first applied to the cover glass prior to the enhancement treatment to block substantially all ion diffusion through the coated portion of the cover glass. Coatings or masks can have a thickness of from about 5-500 nm, although other thicknesses may be used where appropriate. In this illustration, the coated surface of the glass article, upon completion of the chemical strengthening process, would not include a compressive stress region, whereas the remainder of the cover glass would exhibit a compressive stress region. Upon completion of the chemical strengthening process, the coating or mask could be removed via polishing from the cover glass, providing a surface having asymmetric strengthening, or could be left on the surface of the glass, as part of the finished glass article. In this aspect, the coating or mask would be tailored to an appropriate thickness and composition in order to remain part of the cover glass.

In other embodiments, the silicon nitride coating can be oxidized after the chemical strengthening process is complete to provide a more ion-permeable barrier. The same cover glass may now be re-immersed and processed through chemical strengthening, such that some ion diffusion occurs through the silicon dioxide barrier, and thereby some compressive stress region is formed at the locale (while the remainder of the cover glass has been treated twice).

As just noted, a coating composed of alternative materials, silicon dioxide for example, can also be used to limit, rather than eliminate, ion diffusion to the surface of the glass. For example, a coating composed of silicon dioxide would only limit ion diffusion to the cover glass surface, allowing some level of compressive stress region formation in the coated region, but not the complete strengthening contemplated by the ion-exchange baths. As above, the coating would be either removed upon completion of the chemical strengthening process, or left in place as part of the finalized article. In either case, the cover glass would have a surface with asymmetric strengthening and a pattern of asymmetric strengthening. These patterns can be used, along with glass density and heating (above), to form both strengthened and flat glass surfaces. Using these tools for asymmetric strengthening, patterns are applied to glass articles to form regions of increased compressive stress to protect the article for its intended use and to balance out or oppose those forces to reduce or limit warpage on the cover glass. In addition, regions of tensile stress are positioned between these compressive stress regions that extend from the front and rear surfaces of the cover glass. The tensile stress regions are pushed between the front surface and rear surface compressive stress regions, and, as seen in FIG. 7C, are adjacent the lower compressive stress region and pushed away from the higher and deeper compressive stress region.

FIG. 11B shows combinations of coating types (1100, 1102, 1104) and thicknesses that can be used in designing an asymmetrically strengthened glass surface. In FIG. 11B, a series of coatings or masks (1100, 1102, 1104) are applied to both the front and rear surface (1106 and 1108, respectively) of a cover glass 1110. Each combination of coating or masking material is meant to control ion diffusion to the target glass surface, and thereby modify the chemical strengthening of that surface 1112.

The cover glass can exchange and incorporate ions to a particular depth and concentration based on the ion diffusion through masks 1100, 1102 and 1104. As described previously, the change in ion concentration along the surface, and to particular depths, modifies the glass internal stress relationship. In the stress pattern resulting from the mask configuration shown in FIG. 11B the edges 1116 of the front surface 1106, having no mask, receive the most robust ion concentration along the surface, and to the greatest depth. The remainder of the front surface 1106 shows some reduced ion incorporation, but to a lower extent than at the edges 1116. The rear surface 1108, being internal, for example, has multiple regions defining three areas of ion incorporation 1116, 1118, 1120, based on the layered coatings. The center region 1120 of the rear surface has little or no ion incorporation due to masks 1100, 1102, and 1104. The combined masks eliminate almost all ion diffusion into the center region. The other regions show some ion diffusion that result from either the single coating or the combination coating. Thus, a stress relationship where multiple masks (ion barriers) have been applied to prepare an asymmetrically strengthened cover glass is achieved. The combination of masks is applied to prepare the appropriate strengthening requirements, as well as oppose one another and form a cover glass having little or no warpage.

It is further envisioned that multiple layers of mask can also be used to control the ion diffusion process into the target cover glass surface. For example, a thin mask that limits sodium and potassium ion diffusion from a chemical strengthening process by 25% could be layered across a first thicker mask that limits sodium and potassium ion diffusion by 50%. The glass surface region would potentially have a region limited of ion diffusion by 0% (no mask), 25% (first mask), 50% (second mask), and 75% (layered mask); other embodiments may have different percentages for each mask. As above, the finished cover glass surface could include each of the masking layers, or could be treated to remove the masks, leaving only the underlying asymmetrically strengthening surfaces. It is also envisioned that the ion-diffusion barrier coatings can be combined with the ion-barrier masks to further allow for calibrated glass article surface strengths—for example, physically mask a rear surface of the cover glass and coat patterns or locales with a 25% ion diffusion barrier on the front surface of the cover glass.

The use of any of the above described asymmetric chemical strengthening tools can be used to prepare a cover glass for its intended use, while maintaining flat surfaces (e.g., having an absence of warpage and being no more than 100-120 μm out of plane). Parameters would first identify regions of the cover glass in need of increased chemical strengthening and then regions that can be used to oppose or limit the warpage formed by the required chemical strengthening zones. In some embodiments a cover glass can have a front surface that includes a first compressive stress region that extends into the cover glass from the front surface to a first depth. The front surface also includes a second compressive stress region that extends into the cover glass from the front surface to a second depth. The second depth is less than the first depth. The opposing rear surface has a third compressive stress region that extends into the cover glass from the rear surface toward the first compressive stress region and has a third depth. The opposing rear surface also has a fourth compressive stress region that extends into the cover glass from the rear surface toward the second compressive stress region to a fourth depth. The fourth depth is greater than the third depth. A first tensile stress region is positioned between the first compressive stress region and the third compressive stress region, and a second tensile stress region is positioned between the second compressive stress region and the fourth compressive stress region.

As noted previously, asymmetric chemical strengthening results in an increase in the concentration of exchanged ions within a treated zone of a glass article. As a zone of glass is strengthened, the incorporation of ions can lead to formation of compressive forces within the glass that can result in bending and loss of a substantially flat surface.

Figure 12:
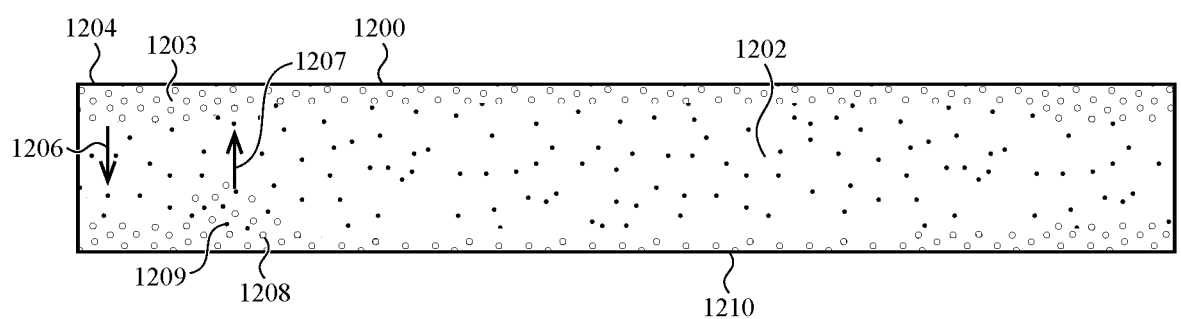
FIG. 12 is a cross-sectional diagram of a glass cover that illustrates patterned asymmetric chemical strengthening.

As shown in FIG. 12, chemically strengthening a top (front) surface 1200 of a cover glass 1202 is highly useful for impact resistance and impact damage protection. However, as schematically shown in the cross-sectional view of FIG. 12, an increased volume of ions 1203 in the top surface edge tends to cause expansion of the front surface. Since the volume of ions 1203 is greater than that at the corresponding region of rear surface 1210, downward deformation or curvature (schematically shown by arrow 1206) may occur at region 1204 and the result could be a warped cover glass. However, other regions 1208, for example, of the cover glass can be asymmetrically strengthened to oppose the deformation 1206 with an opposite deformation (schematically shown by arrow 1207) from the rear edge 1210 of the cover glass. Region 1208 has received a similar increase in volume of ions 1209 to deform the zone of glass in the opposite direction, as shown by arrow 1207. The combined forces allow the front and rear edges to remain substantially flat due to the relative balance of forces acting on the glass. Avoidance of warpage by including various patterned asymmetrically strengthened regions can be utilized such that a compressive force region in one direction can be partially or fully compensated for by a compressive force region in a different zone of the glass. The pattern or overall combination of chemically strengthened regions results in the cover glass having substantially flat surfaces.

Figure 13:
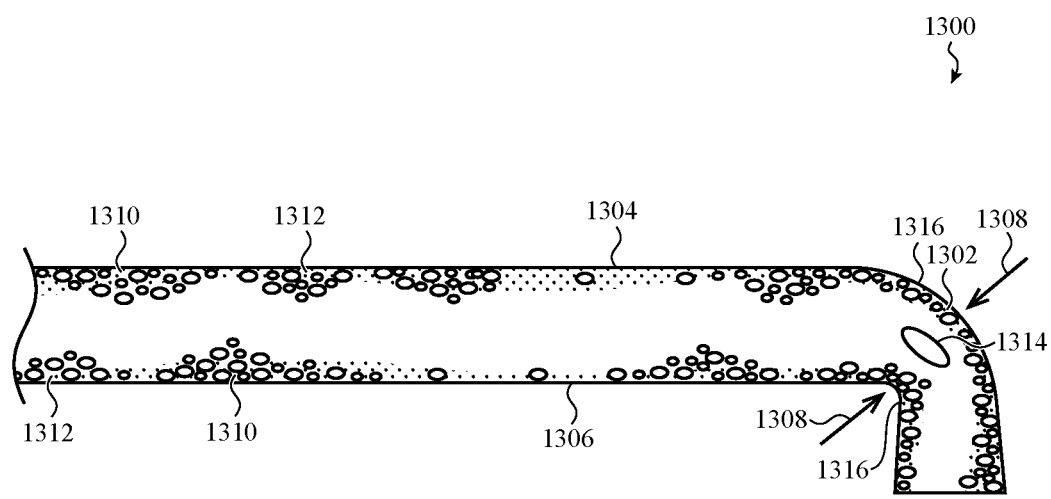
FIG. 13 is a cross-sectional diagram of a glass cover that illustrates warpage at an edge of a cover glass due to asymmetric chemical strengthening.

FIG. 13 shows an example of additional cover glass embodiments which include a localized curve or bend. The localized curve or bend creates a non-planar or contoured cover glass profile or shape. The cover glass may be formed or machined to create the localized curve or bend and the non-planar profile or shape. In the following description, cover glass 1300 of FIG. 13 is described as having a bend 1302. However, cover glass 1300 may alternately be described as having a curve 1302.

As in the previous description, patterned asymmetric chemical strengthening can be utilized to ensure both safety to the cover glass 1300 and minimize potential damage to the cover glass at the bend 1302. As shown in FIG. 13, an illustrative cross-sectional view of a cover glass 1300 shows that inclusion of patterned asymmetric chemical strengthening along the surfaces (front 1304 and rear 1306) of the cover glass 1300 can be maintained, except where the cover glass 1300 bends 1302 and shows a thinning (shown by arrows 1308) of the cover glass 1300. As shown in FIG. 13, the cover glass 1300 has a pattern of high compressive stress regions 1310 and lower compressive stress regions 1312 extending into the cover glass 1300 from the front 1304 and rear 1306 surfaces. The front 1304 and rear 1306 surfaces may define a central zone of the cover glass.

However, the depth of the compressive stress regions 1316 is minimized at the bend 1302. For example, the depth of the compressive stress regions 1316 may be less than those of compressive stress regions 1310 and 1312 to maintain the level of tensile stress 1314 below a desired level. Given the reduced thickness of the cover glass 1300 at bend 1302, opposition of deeper compressive stress regions at the bend may unduly increase the central tension at the bend. As shown in FIG. 13, the compressive stress region 1316 at the bend 1302 is more symmetric between the front and rear surfaces and a middle of the glass centerline maintained by the resultant tensile stress region. In embodiments, the thickness of the cover glass (e.g., at the bend) is maintained at or above a specified thickness so as not to unduly decrease the thickness of the tensile stress region and unduly increase the central tension in the glass.

In additional embodiments, an asymmetric chemical strengthening pattern, such as any of the asymmetric chemical strengthening patterns described herein, may be applied to a central zone of a glass article including a localized bend. The localized bend may be located between a central zone and a peripheral zone of the glass article. The localized bend and the peripheral zone may be strengthened differently than the central zone as shown as FIG. 13.

As previously discussed in FIG. 7C, a stress profile at any one zone may include an asymmetric stress profile for a glass article where the top (front) surface shows a more significant surface compressive stress CS and compressive stress layer depth (DoL) than the rear surface 1306. Note that the front surface 1304 would, in this case, be more durable and impact resistant than the rear surface 1306. The inclusion of additional compressive stress on the surface may be compensated for by a much shallower depth of compression on the bottom (rear) surface. In the absence of the compensation (e.g., if the stress profile were symmetric rather than asymmetric), the tensile forces may lead to an undesirable central tension value (tensile forces may extend undesirably far to the left in the stress profile, potentially to a central tension value which could cause failure of the cover glass). In addition, the greater expansion of the top surface may cause both top and bottom surfaces to begin to bend or curve. The result can be localized warpage of the top and bottom surfaces. However, as described herein, the stress pattern can compensate for the localized warpage of the top and bottom surfaces.

Compressive stress layers typically show a maximal level of stress at or near the surface of the glass article, which decreases as the ions migrate deeper into the glass. At the surface of a surface compressive stress layer, the compressive stress force can be up to 750 MPa and decrease to zero over the distance of 100 to 150 μm into the glass. Other compressive stress versus depth of compression ratios can be utilized dependent on the need and type of asymmetric chemical strengthening used, for example, for the densified glass shown in FIG. 6 (see region 602). Impact at a zone in the glass article having 750 MPa compressive stress at the surface would likely not allow for crack formation or propagation, whereas impact at a zone on the surface having 150 MPa, for example, very possibly could. It is the patterning of these forces that allow for a reduction or limitation of warpage and for preparation of a pathway for crack propagation.

Figure 14A:
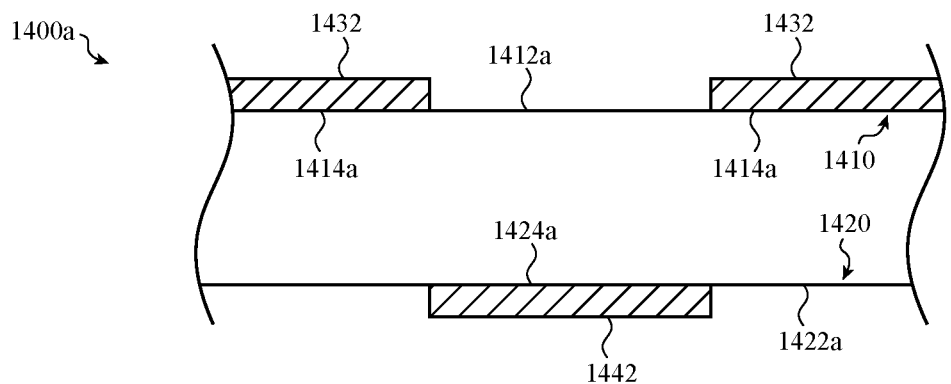
FIGS. 14A, 14B, and 14C depict examples of masks applied to the front and rear surface of a cover glass.
Figure 14B:
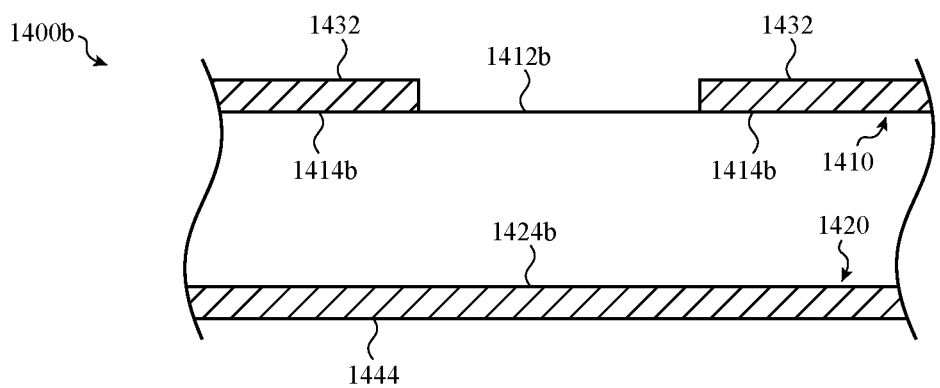
Figure 14C:
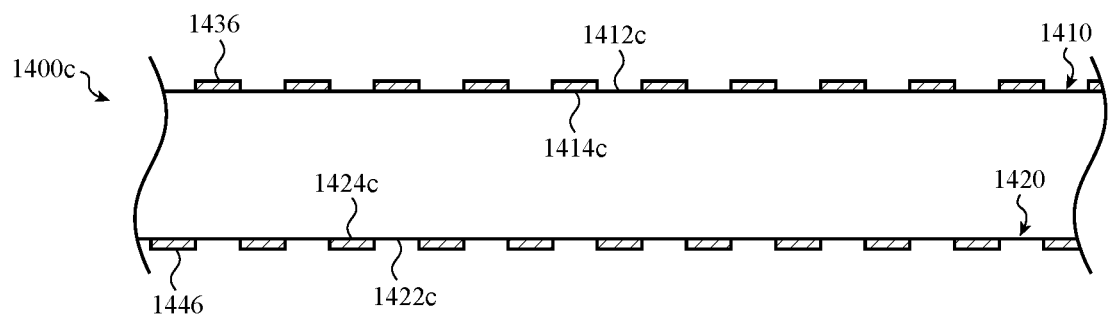

FIGS. 14A, 14B, and 14C depict examples of masks applied to the front and rear surface of a cover glass. For example, the mask configuration depicted in FIG. 14A can be used to produce adjacent zones with opposing asymmetric stress profiles such as depicted in FIGS. 7C and 7D. As depicted in FIG. 14A, the masks 1432 cover the portions 1414*a* of the front surface 1410 of the cover glass 1400*a*, leaving the portion 1412*a* uncovered. The mask 1442 covers the portion 1424*a* of the rear surface 1420 of cover glass and leaves the portion 1422*a* uncovered.

An example chemical strengthening process includes two ion-exchange operations, with the mask being removed between the two ion-exchange operations. During a first ion-exchange operation, ions from the first ion-exchange bath will diffuse deepest into the glass from the portions 1412*a* and 1422*a*, which are uncovered by the masks 1432 and 1442. As a result, ion-exchanged regions resulting from the first ion-exchange operation extend deeper from portions 1412*a* and 1422*a* than from portions 1414*a* and 1424*a*. In embodiments, the ion-exchanged regions do not substantially extend under portions 1414*a* and 1424*a* after the first ion-exchange operation. In further embodiments, the ion-exchanged regions extend under portions 1414*a* and 1424*a* (e.g., under the edges of the mask), but to a lesser extent than under portions 1412*a* and 1422*a*.

After removal of the masks 1432 and 1442, a second ion-exchange operation introduces ions from the second ion-exchange bath along portions 1412*a*, 1414*a*, 1422*a*, and 1424*a*. The ion-exchanged regions resulting from the first ion-exchange operation are modified during the second ion-exchange operation. The first and second ion-exchange operations may form an ion-exchanged layer along each of the front surface 1410 and the rear surface 1420 of the cover glass. In embodiments, the depth of the ion-exchanged layer will vary along each of the front and the rear surface and have a greater depth under the regions 1412*a* and 1422*a*.

Figure 15A:
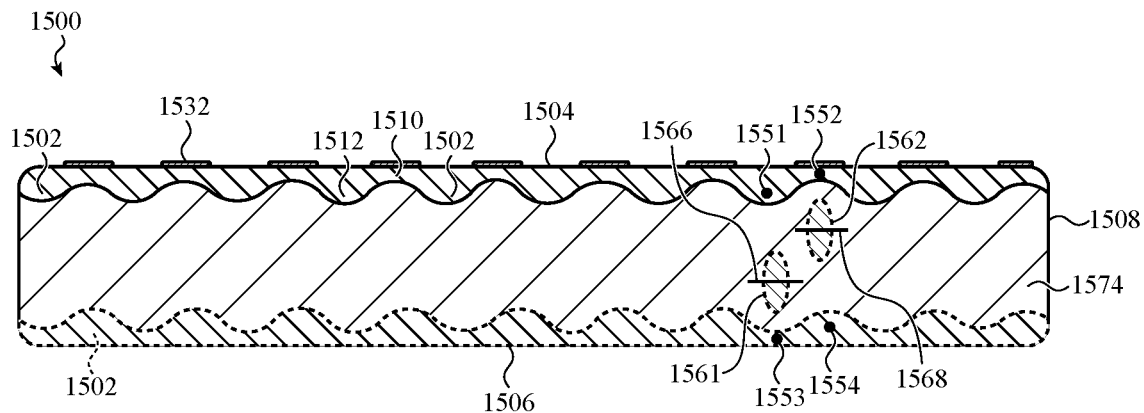
FIG. 15A is a cross-sectional diagram of a cover glass having illustrative patterned asymmetric strengthening in accordance with embodiments herein.

The variation in the depth of the ion-exchanged layer along the front and/or rear surface leads to a variation in the depth of the compressive stress layer along the front and/or rear surface. For example, regions of the compressive stress layer extending from portions of the front or rear surface which were not covered by the mask may have a greater depth of compressive stress layer, as schematically illustrated in FIG. 15A. The zone of the cover glass defined between surfaces 1412*a* and 1424*a* is asymmetrically strengthened, as is the zone defined between surfaces 1414*a* and 1422*a*. However, the asymmetry of these two zones is opposite, with the deeper compressive stress regions formed at the portion 1412*a* of the front surface 1410 and at the portion 1422*a* of the rear surface 1420.

The mask configuration depicted in FIG. 14B can be used to produce a zone with an asymmetric stress profile adjacent to a zone with a symmetric stress profile. As depicted in FIG. 14B, the masks 1432 cover the portions 1414*b* of the front surface 1410 of the cover glass 1400*b*, leaving the portion 1412*b* uncovered. The mask 1444 covers the portion 1424*b* of the rear surface 1420 of the cover glass. The zone defined between portions 1412*b* and 1424*b* may be strengthened asymmetrically while the zone defined between portions 1414*b* and 1424*b* may be strengthened symmetrically.

The mask configuration depicted in FIG. 14C can be used to produce a series of adjacent zones with opposing asymmetric stress profiles. As depicted in FIG. 14C, the masks 1436 cover the portions 1414*c* of the front surface 1410 of the cover glass 1400*c*, leaving the portions 1412*c* uncovered. The masks 1446 cover the portions 1424*c* of the rear surface 1420 of the cover glass and leave the portions 1422*c* uncovered. The zones of the cover glass defined between portions 1412*c* and 1424*c* are asymmetrically strengthened, as are the zones defined between portions 1414*c* and 1422*c*. However, the asymmetry of these two zones is opposite, as previously described for FIG. 14A. As shown in FIG. 14C, both the size of the masks and the spacing of the masks along a given surface of the cover glass may be substantially uniform. In additional embodiments, the size of the masks and/or the spacing of the masks may vary in order to provide the desired compressive pattern.

As described for FIGS. 14A-14C, deeper ion-exchanged layers may be formed along regions of the cover glass surface which are not covered by a mask. In alternate embodiments, a first set of masks may be used to form the deeper ion-exchanged regions and a second set of masks may be used to form the shallower ion-exchanged regions. The first set of masks may cover first portions of the cover glass surface and the second set of masks may cover second portions of the surface of the cover glass surface. In some embodiments, the first portions of the cover glass surface may partially overlap the second portions of the cover glass surface. In further embodiments, the first portions of the cover glass surface may not overlap the second portions of the cover glass surface.

FIG. 15A shows a representative cross-sectional view of a glass article 1500 having a series of asymmetrically strengthened zones 1502 along the front 1504 and rear 1506 surfaces, showing how a pattern of strengthening on the front and rear surfaces can be used to maintain relatively flat surfaces. In this example, a pattern of high and low compressive stress at the front surface 1504 opposes the opposite pattern of low and high compressive stress at the rear surface 1506. In this example, the pattern extends across the entirety of the glass article 1500. For simplicity, compressive stress regions are not shown in FIG. 15A as extending along side surfaces 1508. However, in additional embodiments compressive stress regions may formed along side surfaces 1508.

FIG. 15A also schematically depicts the positions of masks 1532 of material along the front surface 1504 during an ion-exchange operation. The masks 1532 can be used during chemical strengthening to limit ion diffusion along the front surface 1504, where a shallow or low surface compression 1510 is required. In between areas of masking, deeper and more robust ion diffusion can occur and allow for a deeper surface compression region 1512. As depicted in FIG. 15A, the transition between a compressive stress region having a greater depth of layer and an adjacent compressive stress region having a lesser depth of layer may be a gradual transition rather than a step transition. Additional techniques as described above can be used to prepare different zones of compressive stress and, therefore, different patterns of compressive stress, for example, densified glass.

As depicted in FIG. 15A, an opposite pattern is achieved on the rear surface of the same glass article, such that a high compressive stress front region is opposed by a low surface compressive rear region, and vice versa. The alternation of stress patterns across the front and rear surfaces work to oppose each other, so as to yield a glass article having substantially flat front and rear surfaces. Any number and shaped regions can be utilized to form a pattern, as long as the combinations of forces act to result in a substantially flat surface.

FIG. 15A depicts an example pattern of adjacent asymmetric stress regions that form complementary pairs. In particular, as shown in FIG. 15A, the glass article 1500 (e.g., a cover glass) includes a first compressive stress region 1551 that extends into the glass article 1500 from the front surface 1504 a first depth. A second compressive stress region 1552 extends into the glass article 1500 from the front surface 1504 a second depth that is less than the first depth. A third compressive stress region 1553 extends into the glass article 1500 from the rear surface 1506 toward the first compressive stress region 1551 a third depth. A fourth compressive stress region 1554 extends into the glass article 1500 from the rear surface 1506 toward the second compressive stress region 1552 a fourth depth that is greater than the third depth. In some cases, the first depth is approximately equal to the fourth depth, and the second depth is approximately equal to the third depth. In some cases, the first depth is at least twice the second depth and the fourth depth is at least twice the third depth. In embodiments, the first depth may be a maximum depth of the first compressive stress region and the fourth depth may be a maximum depth of the fourth compressive stress region. In addition, the second depth may be a minimum depth of the second compressive stress region and the third depth may be a minimum depth of the third compressive stress region. In some instances, the first compressive stress region 1551 and the second compressive stress region 1552 may also be referred to as a (first or second) front localized compressive stress region. Similarly, the third compressive stress region 1553 and fourth compressive stress region 1554 may also be referred to as a (first or second) rear localized compressive stress region. In some cases, the first (localized) compressive stress region 1551 is at least partially surrounded by the second compressive stress region 1552.

In embodiments, the compressive stress regions are formed using two ion-exchange operations with an intermediate operation of removing the mask(s) from the glass article. For example, a first ion-exchange operation comprises exchange of lithium ions in the glass for sodium ions in a first ion-exchange bath and a second ion-exchange operation comprises exchange of sodium ions (and optionally lithium ions) in the glass for potassium ions in a second ion-exchange bath. The potassium ions introduced by ion exchange may extend into the glass article to substantially the same depth along the front and the rear surfaces of the glass article. However, the sodium ions introduced by ion exchange may extend to greater depths from portions of the front and the rear surface which were not covered by masks (e.g., 1532). As a result, each of the respective compressive stress regions 1551, 1552, 1553, and 1554 include potassium ions. The greater depth of compressive stress regions 1551 and 1554 may be due to the greater depth of sodium ion diffusion into the glass article during the first and second ion-exchange operations.

In some instances, the process to form the compressive stress regions may include an ion-exchange operation comprising ion exchange of ions in the glass for potassium ions in an ion-exchange bath before removal of the mask(s) from the glass article. In embodiments, the process further includes an additional ion-exchange operation comprising exchange of ions in the glass for potassium ions in an ion-exchange bath after removal of the mask(s) from the glass article. In embodiments, each of the respective compressive stress regions 1551, 1552, 1553, 1554 include potassium ions that extend into the glass article 1500 to a depth that corresponds to the respective depths depicted in FIGS. 15A-15C. In some cases, the first (localized) compressive stress region 1551 is at least partially surrounded by the second compressive stress region 1552. The first (localized) compressive stress region 1551 includes potassium ions that extend into the enclosure at a first depth and the second compressive stress region 1552 includes potassium ions that extend into the enclosure at a second depth that is less than the first depth. In some cases, the first depth is at least twice the second depth.

FIG. 15A also schematically depicts a first tensile stress region 1561 positioned between the first compressive stress region 1551 and the third compressive stress region 1553 and a second tensile stress region 1562 positioned between the second compressive stress region 1552 and the fourth compressive stress region 1554. As schematically shown in the FIGS. 15A and 15C, a first centerline 1566 of the first tensile stress region 1561 is offset with respect to a second centerline 1568 of the second tensile stress region 1562. In addition, the depth of the maximum central tension of the first tensile stress region may be offset with respect to the depth of the maximum central tension of the second tensile stress region, as schematically shown in FIGS. 7C and 7D. In an alternative embodiment, a first tensile stress region is formed between the first compressive stress region and the fourth compressive stress region. A second tensile stress region is formed between the second compressive stress region and the third compressive stress region, such that the first tensile stress region is offset with respect to a centerline of the cover sheet in a first direction and the second tensile stress region is offset with respect to the centerline in a second direction that is opposite to the first direction.

Figure 15B:
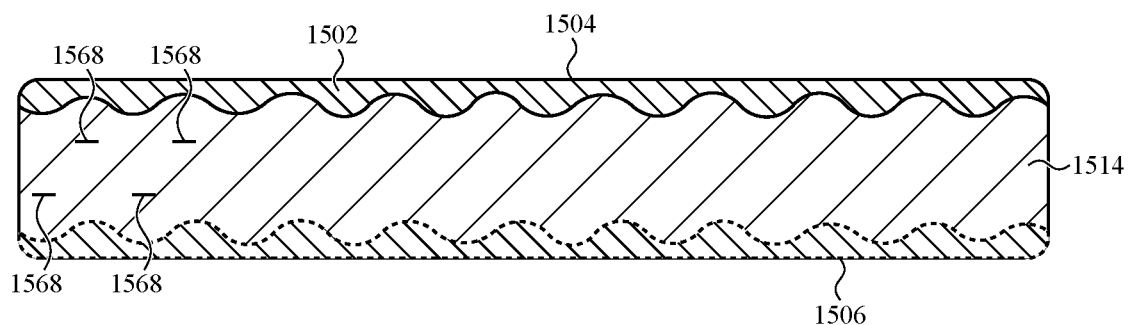
FIG. 15B is a cross-sectional diagram of a cover glass further illustrating patterned asymmetric strengthening in accordance with embodiments herein.

As shown in FIG. 15B the corresponding areas of tensile stress 1514 are in the central region of the glass (between the compressive stress of the asymmetrically strengthened zones 1502 along the front and rear surfaces). Note that the tensile stress is located between opposing front and rear surfaces, where the tensile stress is pushed away from the deeper and higher surface compression. A pattern of surface compression stress and tensile stress extends between a front 1504 and rear 1506 surface of the glass article. The combination of forces within the glass article can be used to both limit damage to the glass article, as well as maintain the glass article's flat surfaces. Note that the centerline of tensile stress 1568 within the tensile stress area 1514 changes with respect to the differing compressive stress regions.

In addition, by utilizing the surface compression stress and resultant tensile stress, impact or damage induced cracks can be controlled to follow paths of lower compressive stress, higher tensile stress, or combinations thereof. A glass article can be patterned using asymmetric chemical strengthening to control and direct impact at a corner or edge away from priority areas of the glass surfaces, and toward areas where a crack is of less visibility, for example.

Figure 15C:
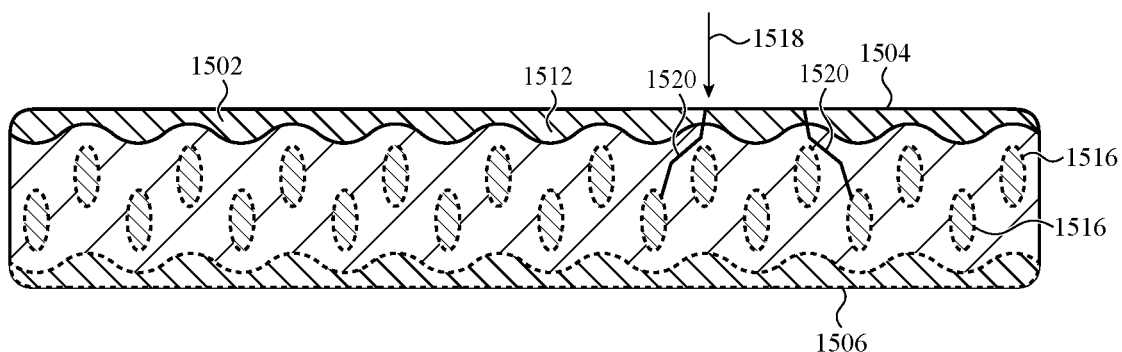
FIG. 15C is a cross-sectional diagram of a cover glass showing patterned asymmetric strengthening and resultant tensile stress in accordance with embodiments herein.

FIG. 15C shows a cross-sectional view of glass that exhibits tensile stress 1516 between the asymmetrically strengthened zones 1502 along the two surfaces 1504, 1506. Areas of tensile stress 1516 are resident based on the asymmetry of the compressive stress exerted by the front and rear surfaces. Impacts (shown as arrow 1518) at a front surface of glass migrate (line 1520) and propagate away from higher surface compression and toward areas of more accessible tensile stress. Areas of relatively low tensile stress can be utilized to capture impact propagation. Further, areas of tensile stress can be utilized to turn or deviate a crack toward the tensile stress and away from the higher surface compression. As such, positioning of the tensile stress provides avenues for directing or turning impact crack propagation toward zones in the glass of lower priority.

Figure 15D:
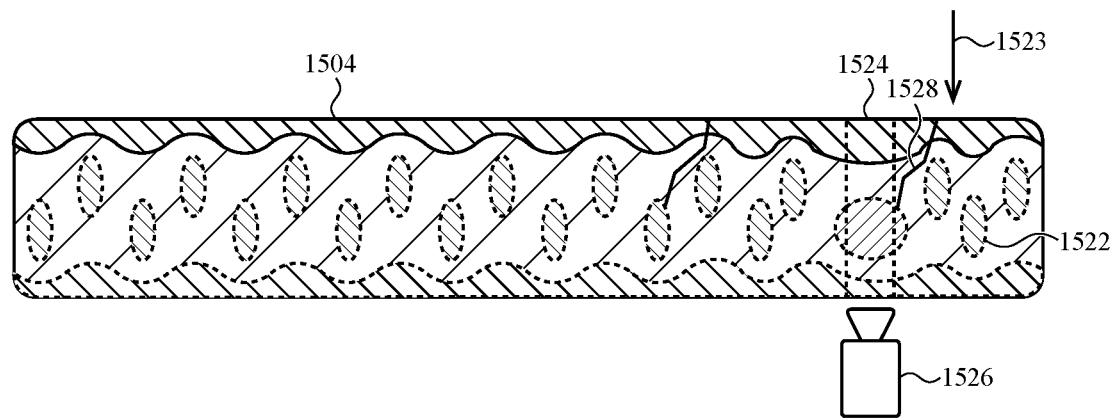
FIG. 15D is a cross-sectional diagram of a cover glass showing patterned asymmetric strengthening around a camera underneath a cover glass in accordance with embodiments herein.

As shown in FIG. 15D, the dimensions and stress levels of the compressive stress regions in a glass article may be adjusted to provide protection to priority areas from impact crack propagation. For example, a camera 1526 may be positioned below a camera window 1524. A localized compressive stress region extending from the front surface 1504 in the zone defined by the camera window 1524 has a level of compressive stress that is greater than that of adjacent localized compressive stress regions. In addition, a width of the localized compressive stress region extending from the front surface 1504 in the zone defined by the camera window 1524 may be different from that of the adjacent localized compressive stress regions. As shown in FIG. 15D, the width of the localized compressive stress region extending from the front surface 1504 in the zone defined by the camera window 1524 is greater than that of the adjacent localized compressive stress regions. Similarly, the width of the localized compressive stress region extending from the rear surface in the zone defined by the camera window 1524 is greater than that of the adjacent localized compressive stress regions. In embodiments, the desired relative widths of the localized compressive stress regions may be achieved by adjusting the size and spacing of the masks applied to the front and rear surfaces of the glass article.

The pattern of stresses shown in FIG. 15D can be utilized to direct impact anticipated in that area of the glass article. For example, impact at a corner can be designed to direct a crack 1528 (due to, for example, impact damage) into a region having opposing and offset compressive stress regions, which may arrest or redirect the crack 1528. Referring to FIG. 15D, impact (shown by arrow 1523) along a front surface 1504 of the cover glass sufficient to begin a crack is directed toward and through regions of lower surface compression, and toward available internal areas of tensile stress 1522. In this example, impact propagation toward the internal tensile stress would be developed to avoid a camera window 1524. Note that regions of densified glass can be included to add high volumes of compressive stress at a surface, but having much lower compressive depth and therefore changed tensile stress. The combinations of these forces are used to direct crack propagation. The same principle may be applied to any transparent window used for an optical sensor, a display, or other optical or visual component.

FIGS. 16A and 16B show simplistic front (FIG. 16A) 1601 and rear (FIG. 16B) 1603 surface views of alternating high and low surface compression. High-surface compression regions 1600 correspond to hatched areas and low-surface compression regions 1602 correspond to non-hatched zones. In some cases, the high-surface compression regions 1600 have a greater thickness or depth as compared to the low-surface compression regions 1602. Since any one cross-sectional area of glass thickness can only include a defined amount of volume, asymmetric chemical strengthening on one surface is typically paired with the other surface having a lesser amount of chemical strengthening. As discussed above, the positioning of opposing stress regions is used to balance out each surface and provide flat surfaces. Any type of stress pattern can be used as long as the stress over the front and/or rear surfaces of the glass article oppose each other and result in substantially flat or flat surfaces. Patterns such as checkerboard, cross-hatch, crisscross, and the like can be input into the front, rear, or front and rear to balance the overall stress forces to a sufficient level that the surfaces are flat.

FIG. 17A shows a schematic of a cover glass having a region 1702 for a camera window and a combined stress profile or pattern used to direct impact damage. In FIG. 17A, avoidance of crack propagation through or within the camera window 1703 view line of the cover glass is important for overall utility. In embodiments, a region 1704 of relatively high compressive stress is provided on the front surface of the glass article around the area where the camera window 1703 is positioned. In embodiments, the region 1704 may have an annular or ring-shaped form. As shown in FIG. 17A, an impact-related crack 1706 would not propagate through the high-surface compression region 1704, but rather through an adjoining low-surface compression region 1708. For example, a crack 1706 that forms at the edge 1710 of a cover glass can be directed both away from prioritized viewing areas 1712 (centrally located) and away from the camera window 1703. In this way, an impact crack can be anticipated and minimized by the use of patterned asymmetric chemical strengthening.

FIG. 17B shows a pattern for directing impact damage from a corner 1750 of a cover glass by using a series of compressive stress regions 1752, 1754. In particular, a series of low-surface compression and corresponding central tension zones formed as a result of compressive stress regions 1752, 1754 are configured to redirect a propagating crack from the corner 1750 and change the direction of the crack from extending to the center 1756 of the cover glass to extending back toward the edges 1758 of the cover glass. A series of such regions can be positioned such that excessive impact force that continues past the first of these regions can be caught and redirected by the second of these regions. The pattern can be continued to provide one or more, two or more, three or more, or four or more such regions that radiate from each corner of the glass article.

Alternative patterns of asymmetric chemical stress are shown in FIG. 18A-18F. In FIGS. 18A-18F, asymmetric chemical strengthening patterns are shown for enhancing the strength of the corner and/or edge zones of a cover glass, while allowing opposing stress to offset for warpage on the opposite surfaces.

Figure 18A:
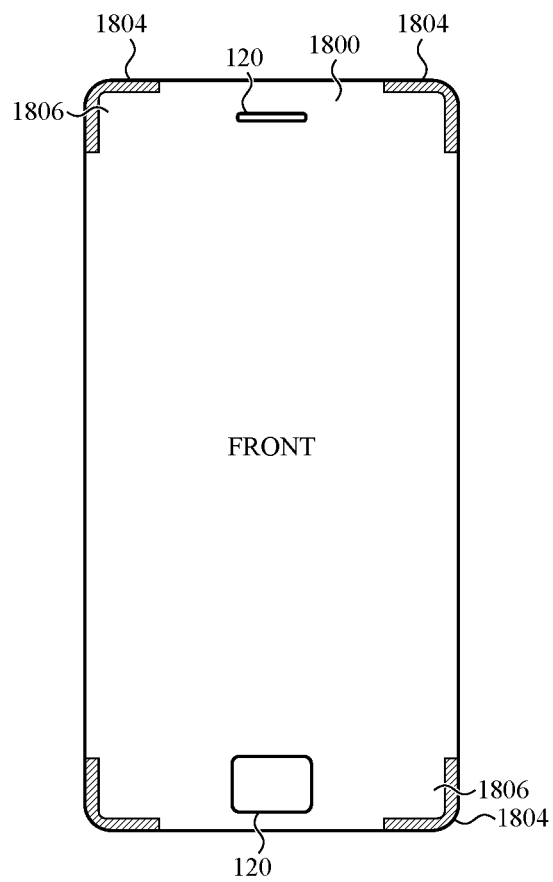
FIG. 18A is a user or top surface view of a cover glass having a pattern to provide chemical strengthening to the corners of the cover glass.
Figure 18B:
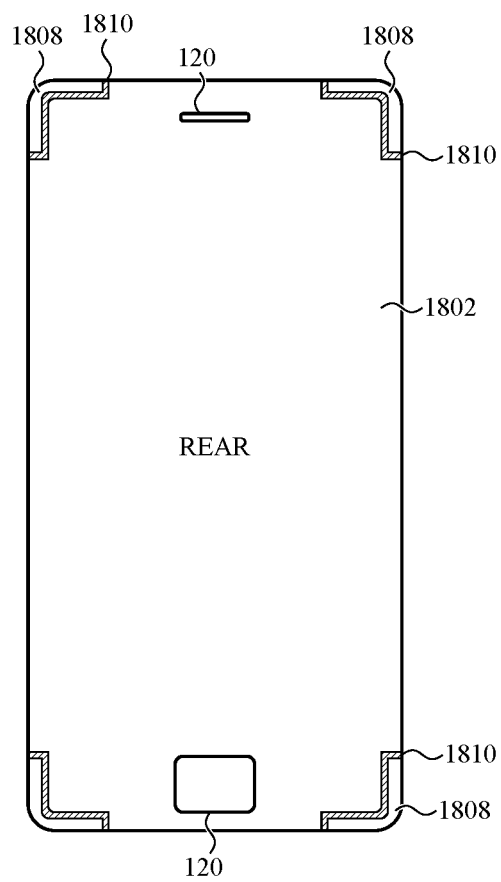
FIG. 18B is an internal or bottom surface view of a cover glass having an opposing strengthening pattern to FIG. 18A that limits cover glass warpage and limits crack propagation.

FIG. 18A and FIG. 18B show a front surface 1800 (FIG. 18A) and rear surface 1802 (FIG. 18B) or an illustrative cover glass, the cover glass defining a rectangular outer perimeter region. The hatched zones 1804 are located at least partially within one of the four corner regions of the cover glass, and show a first localized compressive stress region that extends into the cover glass from the surface to a first depth. A second localized compressive stress region 1806 extends into the cover glass from the front surface a second depth that is less than the first depth. On the rear surface 1802, a third localized compressive stress region 1808 extends into the cover glass from the rear surface toward the first localized compressive stress region 1804 to a third depth. A fourth localized compressive stress region 1810 extends into the cover glass from the rear surface toward the second localized compressive stress region 1806 to a fourth depth, the fourth depth greater than the third depth. Note that in this embodiment, the second compressive stress region 1806 surrounds the first localized compressive stress region 1804. Also note that although not shown, embodiments include having localized compressive stress regions only partially surround other localized compressive stress regions.

As shown in FIGS. 18A and 18B, the compressive stress is patterned to oppose each other, from the front and rear surfaces, to avoid warpage.

Figures 18C, 18D:
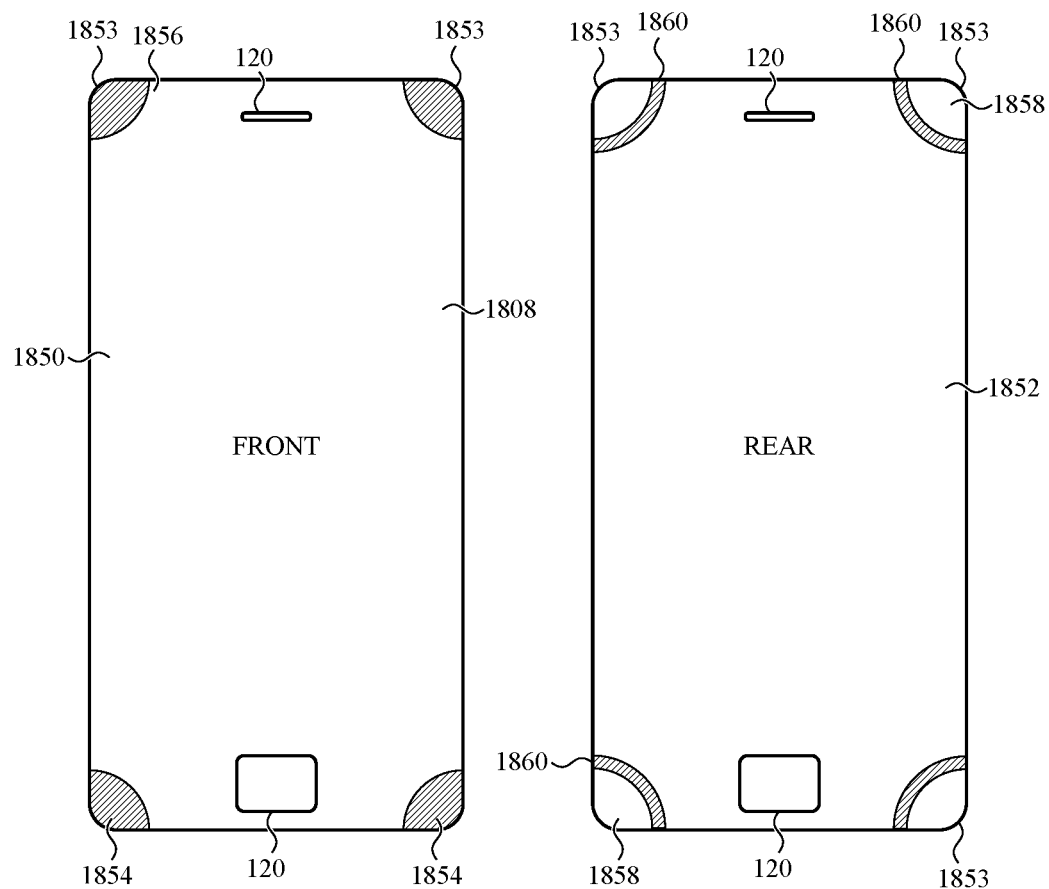
FIG. 18C is a user or top surface view of another cover glass having a pattern to provide chemical strengthening to the corners of the cover glass.
FIG. 18D is an internal or bottom surface view of a cover glass having an opposing strengthening pattern to FIG. 18C that limits cover glass warpage and limits crack propagation.

A similar pattern is shown in FIG. 18C 1850 (front) and FIG. 18D 1852 (rear). A cover glass defines four corner regions 1853. Here, a semi-circular first compressive stress region 1854 located at a corner 1853 of the front surface, extends into the cover glass from the front surface 1850 to a first depth, and a second compressive stress region 1856 extends into the cover glass from the front surface to a second depth. In this example, the first depth is greater than the second depth so as to provide impact damage resistance. A third compressive stress region 1858 extends into the cover glass from the rear surface 1852 toward the first compressive stress region 1854 to a third depth. A fourth compressive stress region 1860 extends into the cover glass from the rear surface toward the second compressive stress region 1856 to a fourth depth. In this example, the fourth depth is greater than the third depth. Note also that the fourth compressive stress region 1860 does not extend over the remainder of the rear surface, but rather only to the extent to limit or avoid warpage and control impact propagation. Also note that the first compressive stress region 1854 and the third compressive stress region 1858 are located at least partially within one of the four corner regions 1853 of the cover glass.

Finally, in FIG. 18E 1870 (front) and FIG. 18F 1872 (rear) surfaces for a cover glass are illustrated. In this design, a first compressive stress region 1874 extends around the rectangular perimeter edge (or outer perimeter region) 1873 of the front surface 1870. The first compressive stress region 1874 extends into the cover glass from the front surface 1870 to a first depth. A second compressive stress region 1876, adjacent to the first compressive stress region 1874, extends into the cover glass from the front surface to a second depth. The first depth is greater than the second depth to improve the impact resistance of the front surface along the edge 1873. As noted above, the rear surface 1872 opposes the front surface 1870. A third compressive stress region 1878 extends into the cover glass from the rear surface 1872 toward the first compressive stress region 1874 to a third depth. A fourth compressive stress region 1880 extends into the cover glass from the rear surface 1872 toward the second compressive stress region 1876 to a fourth depth. The fourth depth is greater than the third depth. In each design of FIGS. 18A-18F, the cover glass has added strength in compressive stress regions 1804, 1854, 1874 where impact damage tends to accumulate and warpage is avoided by opposing compressive stress regions 1808, 1858, 1878 on the opposite face of the glass.

In an alternative embodiment, a cover glass for use in an electronic device, for example, could have a front localized compressive stress region which is at least partially surrounded by a second localized compressive stress region. The first localized compressive stress region includes potassium ions that extend into the enclosure at a first depth. The second localized compressive stress region includes potassium ions that extend into the enclosure at a second depth that is less than the first depth, and the first depth is at least twice the second depth.

Figure 19:
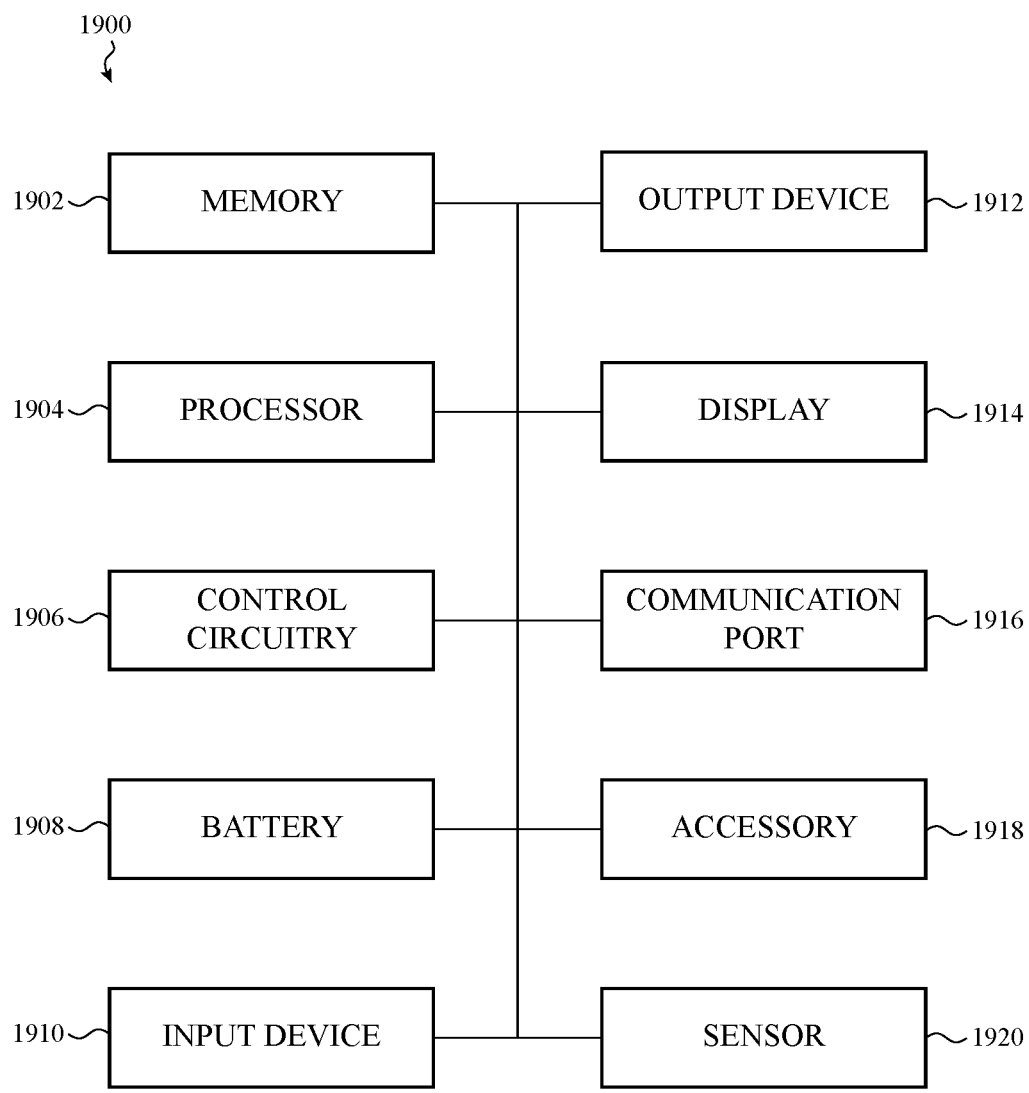
FIG. 19 is a block diagram of example components of an example electronic device.

FIG. 19 is a block diagram of example components of an example electronic device. The schematic representation depicted in FIG. 19 may correspond to components of the devices depicted in FIG. 1A-18F as described above. However, FIG. 19 may also more generally represent other types of electronic devices with a strengthened glass component as described herein.

In embodiments, an electronic device 1900 may include sensors 1920 to provide information regarding configuration and/or orientation of the electronic device in order to control the output of the display. For example, a portion of the display 1914 may be turned off, disabled, or put in a low energy state when all or part of the viewable area of the display 1914 is blocked or substantially obscured. As another example, the display 1914 may be adapted to rotate the display of graphical output based on changes in orientation of the device 1900 (e.g., 90 degrees or 180 degrees) in response to the device 1900 being rotated. As another example, the display 1914 may be adapted to rotate the display of graphical output in response to the device 1900 being folded or partially folded, which may result in a change in the aspect ratio or a preferred viewing angle of the viewable area of the display 1914.

The electronic device 1900 also includes a processor 1904 operably connected with a computer-readable memory 1902. The processor 1904 may be operatively connected to the memory 1902 component via an electronic bus or bridge. The processor 1904 may be implemented as one or more computer processors or microcontrollers configured to perform operations in response to computer-readable instructions. The processor 1904 may include a central processing unit (CPU) of the device 1900. Additionally and/or alternatively, the processor 1904 may include other electronic circuitry within the device 1900 including application specific integrated chips (ASIC) and other microcontroller devices. The processor 1904 may be configured to perform functionality described in the examples above. In addition, the processor or other electronic circuitry within the device may be provided on or coupled to a flexible circuit board in order to accommodate folding or bending of the electronic device.

The memory 1902 may include a variety of types of non-transitory computer-readable storage media, including, for example, read access memory (RAM), read-only memory (ROM), erasable programmable memory (e.g., EPROM and EEPROM), or flash memory. The memory 1902 is configured to store computer-readable instructions, sensor values, and other persistent software elements.

The electronic device 1900 may include control circuitry 1906. The control circuitry 1906 may be implemented in a single control unit and not necessarily as distinct electrical circuit elements. As used herein, "control unit" will be used synonymously with "control circuitry." The control circuitry 1906 may receive signals from the processor 1904 or from other elements of the electronic device 1900.

As shown in FIG. 19, the electronic device 1900 includes a battery 1908 that is configured to provide electrical power to the components of the electronic device 1900. The battery 1908 may include one or more power storage cells that are linked together to provide an internal supply of electrical power. The battery 1908 may be operatively coupled to power management circuitry that is configured to provide appropriate voltage and power levels for individual components or groups of components within the electronic device 1900. The battery 1908, via power management circuitry, may be configured to receive power from an external source, such as an alternating current power outlet. The battery 1908 may store received power so that the electronic device 1900 may operate without connection to an external power source for an extended period of time, which may range from several hours to several days. The battery 1908 may be flexible or attached to a flexible substrate or carrier to accommodate bending or flexing of the electronic device.

In some embodiments, the electronic device 1900 includes one or more input devices 1910. The input device 1910 is a device that is configured to receive input from a user or the environment. The input device 1910 may include, for example, a push button, a touch-activated button, capacitive touch sensor, a touch screen (e.g., a touch-sensitive display or a force-sensitive display), capacitive touch button, dial, crown, or the like. In some embodiments, the input device 1910 may provide a dedicated or primary function, including, for example, a power button, volume buttons, home buttons, scroll wheels, and camera buttons.

The device 1900 may also include one or more sensors 1920, such as a force sensor, a capacitive sensor, an accelerometer, a barometer, a gyroscope, a proximity sensor, a light sensor, or the like. The sensors 1920 may be operably coupled to processing circuitry. In some embodiments, the sensors 1920 may detect deformation and/or changes in configuration of the electronic device and be operably coupled to processing circuitry which controls the display based on the sensor signals. In some implementations, output from the sensors 1920 is used to reconfigure the display output to correspond to an orientation or folded/unfolded configuration or state of the device. Example sensors 1920 for this purpose include accelerometers, gyroscopes, magnetometers, and other similar types of position/orientation sensing devices. In addition, the sensors 1920 may include a microphone, acoustic sensor, light sensor, optical facial recognition sensor, or other types of sensing device.

In some embodiments, the electronic device 1900 includes one or more output devices 1912 configured to provide output to a user. The output device 1912 may include display 1914 that renders visual information generated by the processor 1904. The output device 1912 may also include one or more speakers to provide audio output. The output device 1912 may also include one or more haptic devices that are configured to produce a haptic or tactile output along an exterior surface of the device 1900.

The display 1914 may include a liquid-crystal display (LCD), light-emitting diode, organic light-emitting diode (OLED) display, an active layer organic light emitting diode (AMOLED) display, organic electroluminescent (EL) display, electrophoretic ink display, or the like. If the display 1914 is a liquid-crystal display or an electrophoretic ink display, the display 1914 may also include a backlight component that can be controlled to provide variable levels of display brightness. If the display 1914 is an organic light-emitting diode or organic electroluminescent type display, the brightness of the display 1914 may be controlled by modifying the electrical signals that are provided to display elements. In addition, information regarding configuration and/or orientation of the electronic device may be used to control the output of the display as described with respect to input devices 1910. In some cases, the display is integrated with a touch and/or force sensor in order to detect touches and/or forces applied along an exterior surface of the device 1900.

The electronic device 1900 may also include a communication port 1916 that is configured to transmit and/or receive signals or electrical communication from an external or separate device. The communication port 1916 may be configured to couple to an external device via a cable, adaptor, or other type of electrical connector. In some embodiments, the communication port 1916 may be used to couple the electronic device to a host computer.

The electronic device 1900 may also include at least one accessory 1918, such as a camera, a flash for the camera, or other such device. The camera may be connected to other parts of the electronic device 1900 such as the control circuitry 1906.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Further, the term "exemplary" does not mean that the described example is preferred or better than other examples.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a display;
an optical sensor; and
a cover glass defining a window portion positioned over the optical sensor and extending from a front surface to a rear surface of the cover glass, the cover glass comprising:
a first compressive stress region extending from the front surface to a first depth into the window portion of the cover glass; and
a second compressive stress region extending from the front surface to a second depth, less than the first depth, into the cover glass.

2. The electronic device of claim 1, wherein the cover glass further comprises a third compressive stress region extending from the rear surface toward the first compressive stress region and to a third depth, less than the first depth, into the cover glass.

3. The electronic device of claim 2, wherein the cover glass further comprises a fourth compressive stress region extending from the rear surface towards the second compressive stress region and to a fourth depth, greater than the third depth, into the cover glass.

4. The electronic device of claim 1, wherein the second compressive stress region is positioned adjacent to the first compressive stress region.

5. The electronic device of claim 1, wherein the first compressive stress region defines a first width at the front surface that is greater than a width of the window portion at the front surface.

6. The electronic device of claim 5, wherein the second compressive stress region defines a second width at the front surface that is less than the first width of the first compressive stress region.

7. The electronic device of claim 1, wherein the optical sensor is a proximity sensor.

8. An electronic device, comprising:
a cover glass defining a front surface, a rear surface, and a sensor window portion, the cover glass comprising:
a first compressive stress region extending from a first area of the front surface to a first depth into the cover glass, the first area surrounding the sensor window portion at the front surface; and
a second compressive stress region extending from a second area of the front surface to a second depth, less than the first depth, into the cover glass, the second area at least partially surrounding the first area; and
an optical sensor positioned below the sensor window portion.

9. The electronic device of claim 8, wherein the second compressive stress region surrounds the first compressive stress region at the front surface of the cover glass.

10. The electronic device of claim 9, wherein the cover glass further comprises:
a third compressive stress region extending from the rear surface toward the first compressive stress region and to a third depth, less than the first depth, into the cover glass; and
a fourth compressive stress region extending from the rear surface towards the second compressive stress region and to a fourth depth, greater than the third depth, into the cover glass.

11. The electronic device of claim 10, wherein:
the sensor window portion defines a third area at the front surface; and
the cover glass further comprises a fifth compressive stress region extending from the third area to a fifth depth, less than the first depth, into the cover glass.

12. The electronic device of claim 10, wherein the cover glass further comprises:
a first tensile stress region positioned between the first compressive stress region and the third compressive stress region; and
a second tensile stress region positioned between the second compressive stress region and the fourth compressive stress region.

13. The electronic device of claim 8, further comprising a display, wherein:
the cover glass is positioned over the display; and
the optical sensor is a camera component.

14. The electronic device of claim 8, wherein the cover glass is formed from alumina silicate glass.

15. A cover glass comprising:
a first compressive stress region extending from a first area of a front surface of the cover glass to a first depth into the cover glass, the first area surrounding a sensor window portion of the cover glass at the front surface;
a second compressive stress region extending from a second area of the front surface to a second depth, less than the first depth, into the cover glass, the second area at least partially surrounding the first area; and
a third compressive stress region extending from the front surface to a third depth into the sensor window portion of the cover glass, the third depth less than the first depth.

16. The cover glass of claim 15, wherein:
the cover glass further defines a display window portion; and
the display window portion includes the second area.

17. The cover glass of claim 16, wherein the first compressive stress region is configured to direct crack propagation away from the sensor window portion.

18. The cover glass of claim 16, wherein the sensor window portion defines a camera window.

19. The cover glass of claim 15, wherein the front surface has a flatness that is no more than 120 micrometers out of plane.

20. The cover glass of claim 15, wherein the cover glass is formed from aluminosilicate glass material.

\* \* \* \* \*